United States Patent
Watanabe et al.

(10) Patent No.: US 8,068,142 B2
(45) Date of Patent: Nov. 29, 2011

(54) METHODS, SYSTEMS AND APPARATUS FOR SETTING A RECORDING FUNCTION OF THE RECORDING APPARATUS IN A RESTRICTED STATE

(75) Inventors: Mikio Watanabe, Asaka (JP); Tomomitsu Muta, Asaka (JP); Hisayoshi Tsubaki, Asaka (JP)

(73) Assignee: Fujifilm Corporation, Tokyo (JP)

( * ) Notice: Subject to any disclaimer, the term of this patent is extended or adjusted under 35 U.S.C. 154(b) by 493 days.

(21) Appl. No.: 12/191,810

(22) Filed: Aug. 14, 2008

(65) Prior Publication Data
US 2008/0303909 A1    Dec. 11, 2008

Related U.S. Application Data

(62) Division of application No. 11/213,824, filed on Aug. 30, 2005, now abandoned, which is a division of application No. 09/969,653, filed on Oct. 4, 2001, now Pat. No. 7,619,657.

(30) Foreign Application Priority Data

Oct. 4, 2000  (JP) ................................ 2000-304707
Nov. 1, 2000  (JP) ................................ 2000-334610

(51) Int. Cl.
*H04N 5/232* (2006.01)
*G03B 17/00* (2006.01)

(52) U.S. Cl. ...................... 348/211.2; 348/211.1; 396/56

(58) Field of Classification Search ............. 348/211.99, 348/211.1–211.4, 211.11; 396/56
See application file for complete search history.

(56) References Cited

U.S. PATENT DOCUMENTS

| | | | | |
|---|---|---|---|---|
| 6,396,537 B1 * | 5/2002 | Squilla et al. | ................. | 348/239 |
| 6,522,352 B1 * | 2/2003 | Strandwitz et al. | ......... | 348/211.2 |
| 6,567,122 B1 * | 5/2003 | Anderson et al. | .......... | 348/211.3 |
| 6,715,076 B1 * | 3/2004 | Challapali | .................... | 713/176 |
| 6,931,541 B1 * | 8/2005 | Nakagawa | .................... | 713/193 |
| 6,970,189 B1 * | 11/2005 | Bernstein et al. | .......... | 348/211.2 |

FOREIGN PATENT DOCUMENTS

| | | | |
|---|---|---|---|
| JP | 05342333 A | 12/1993 |
| JP | 10098765 A | 4/1998 |
| JP | 10107875 A | 4/1998 |
| JP | 10-126668 A | 5/1998 |
| JP | 10126668 A | 5/1998 |
| JP | 10161213 A | 6/1998 |

(Continued)

Primary Examiner — Kelly L Jerabek
(74) Attorney, Agent, or Firm — Birch, Stewart, Kolasch & Birch, LLP

(57) ABSTRACT

A recording apparatus includes a communications device which can receive from another communications apparatus by wireless an image-capturing condition of restricting an image-capturing process or a sound recording condition of restricting a sound recording process, and a device which performs an image-capturing or sound recording process according to the received image-capturing condition or sound recording condition. Thus, a user can automatically set a recording function of a recording apparatus in a restricted state without special care in a position where image-capturing, sound recording, etc. are prohibited, thereby recording on an allowed condition. Since it further includes a communications device which can receive by wireless from another communications apparatus a reproducing condition of restricting a reproducing function of an image, and a reproducing device which reproduces an image according to the received reproducing condition, an available function can be used by easily specifying a user of the communications apparatus.

5 Claims, 15 Drawing Sheets

FOREIGN PATENT DOCUMENTS

| | | |
|---|---|---|
| JP | 10229460 A | 8/1998 |
| JP | 10243462 A | 9/1998 |
| JP | 11-261674 | 9/1999 |
| JP | 11-266430 A | 9/1999 |
| JP | 11261674 | 9/1999 |
| JP | 11313237 A | 11/1999 |
| JP | 2000-134602 A | 5/2000 |
| JP | 2000-147623 | 5/2000 |
| JP | 2000-152217 | 5/2000 |
| JP | 2000152217 | 5/2000 |
| JP | 2000-286957 | 10/2000 |
| WO | WO 00/01138 A2 | 1/2000 |

\* cited by examiner

F I G. 1
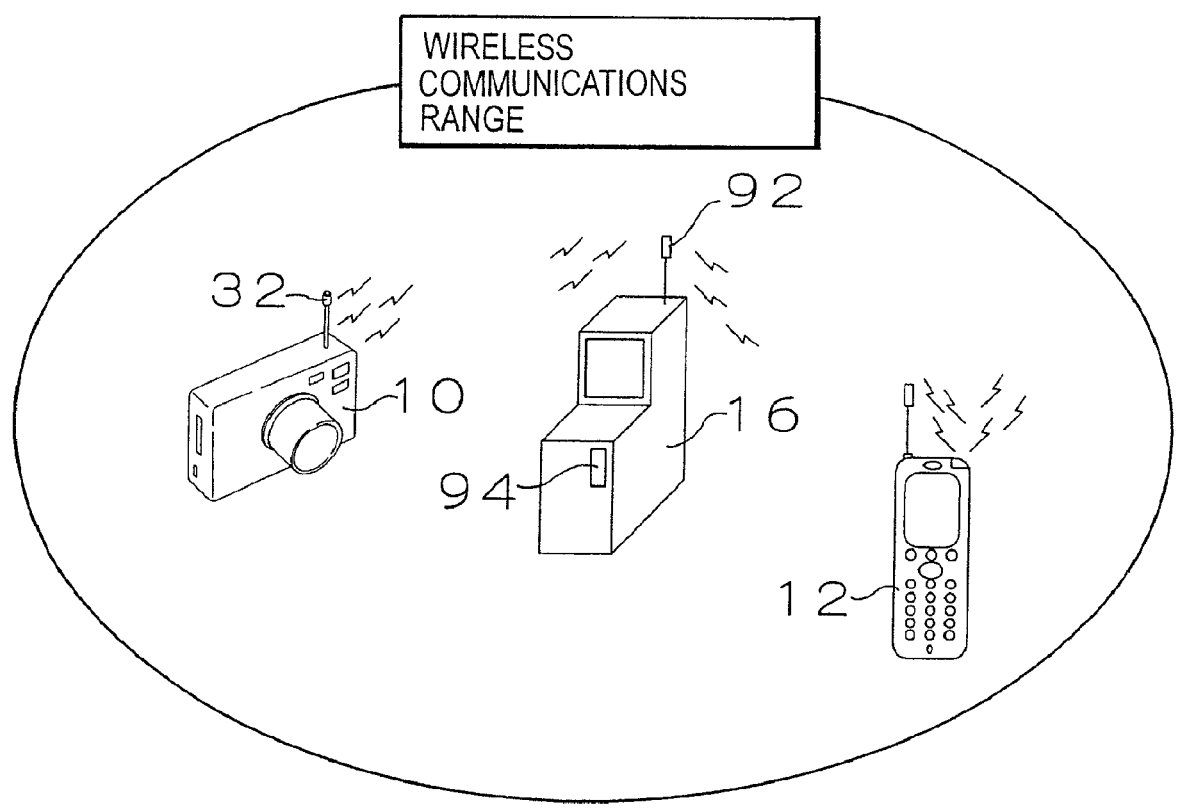

FIG. 4

| ORDER | ELECTRONIC CAMERA | COMMUNICATIONS PORT |
|---|---|---|
| 1 | | TRANSMITTING BY WIRELESS, SEARCHING FOR CONNECTED-TO APPARATUS |
| 2 | SUPPLYING POWER, IMAGE-CAPTURING AND COMMUNICATIONS MODE | |
| 3 | | DETECTING ELECTRONIC CAMERA, ESTABLISHING WIRELESS CONNECTION |
| 4 | | READING MODEL CODE OF ELECTRONIC CAMERA |
| 5 | | READING USER SPECIFIC INFORMATION WHEN PORTABLE TELEPHONE IS AVAILABLE, TRANSMITTING ACCOUNTING INFORMATION |
| 6 | SELECTING AND ACKNOWLEDGING ACCOUNTING | |
| 7 | | CONFIRMING ACCOUNTING, TRANSMITTING IMAGE-CAPTURING RESTRICTING INFORMATION |
| 8 | RECEIVING AND SETTING IMAGE-CAPTURING RESTRICTING INFORMATION | |
| 9 | IMAGE-CAPTURING | |
| 10 | TRANSMITTING IMAGE NUMBER INFORMATION | |
| 11 | | ACCOUNTING |
| 12 | COMPLETING CONNECTION | |

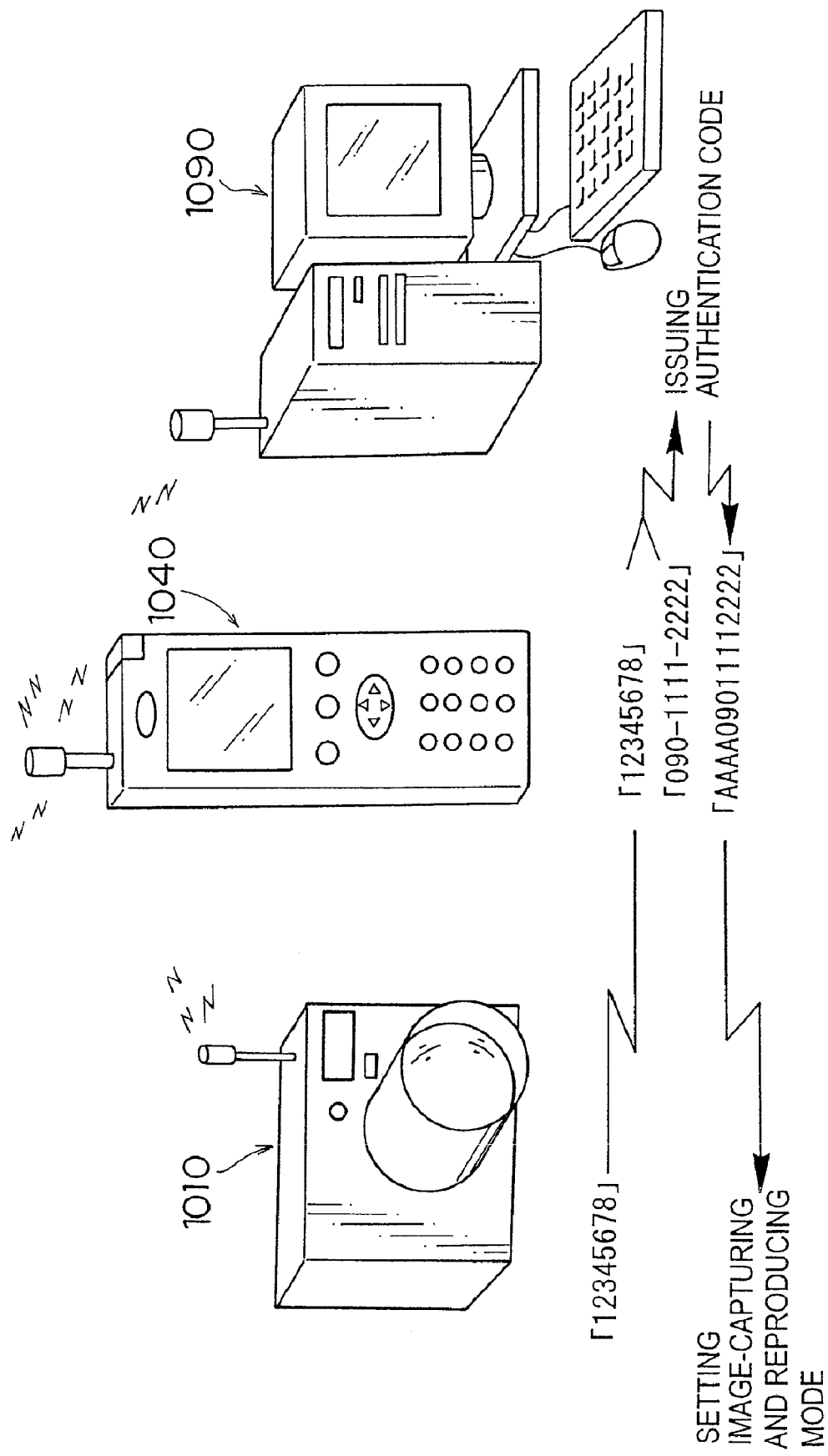

FIG. 9

| | PORTABLE TELEPHONE NUMBER |
|---|---|
| USER a | 090-1111-2222 |
| USER b | 090-1111-3333 |
| USER c | 090-1111-4444 |
| USER d | 090-1111-5555 |

F I G. 1 0

| | SERIAL NUMBER OF CAMERA | BASIC AUTHENTICATION CODE |
|---|---|---|
| CAMERA A | 12345678 | AAAA |
| CAMERA B | 12341234 | BBBB |
| CAMERA C | 11111111 | CCCC |
| CAMERA D | 22222222 | DDDD |
| CAMERA E | 11223344 | EEEE |

F I G. 1 1

|  | USER a | USER b | USER c | USER d |
|---|---|---|---|---|
| CAMERA A | ○ | ○ | ○ | ○ |
| CAMERA B | ○ | ○ | × | × |
| CAMERA C | × | × | ○ | ○ |
| CAMERA D | ○ | × | × | × |
| CAMERA E | ○ | × | × | ○ |

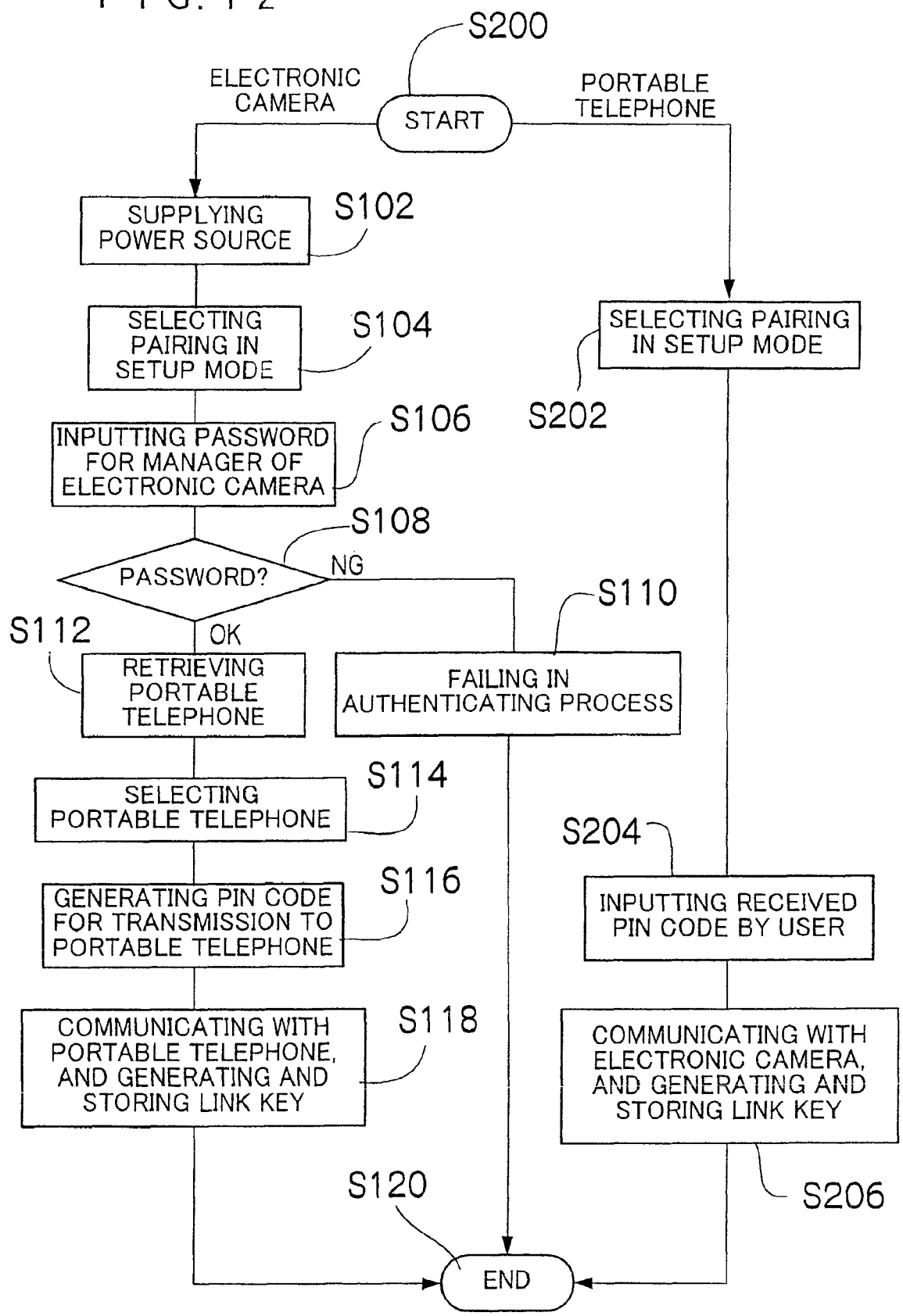

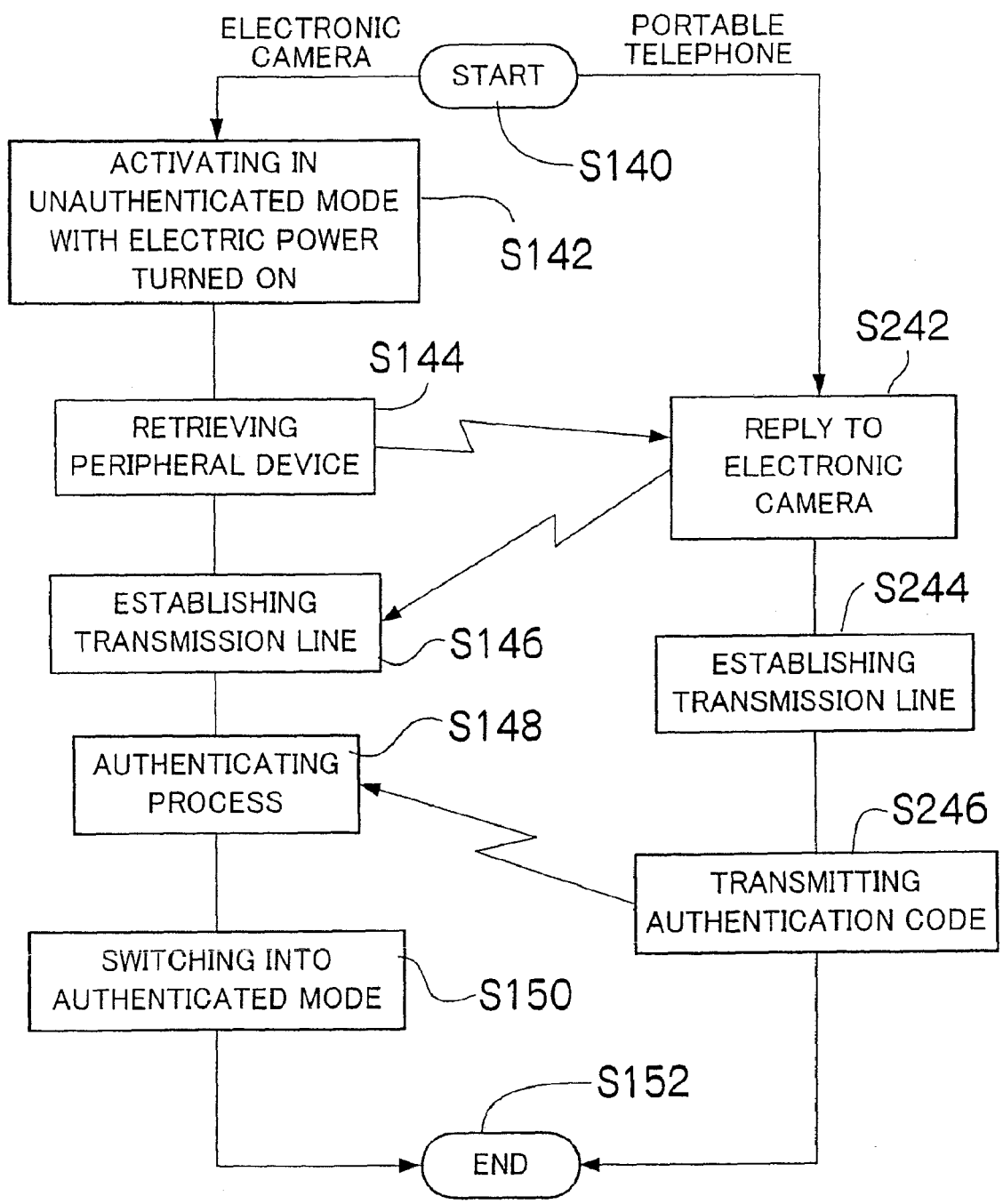

METHODS, SYSTEMS AND APPARATUS FOR SETTING A RECORDING FUNCTION OF THE RECORDING APPARATUS IN A RESTRICTED STATE

This application is a Divisional of application Ser. No. 11/213,824 filed on Aug. 30, 2005 now abandoned, which was a Divisional of application Ser. No. 09/969,653 filed on Oct. 4, 2001 now U.S. Pat. No. 7,619,657 and for which priority is claimed under 35 U.S.C. §120; and this application claims priority of Application No. JP2000-304707 filed in Japan on Oct. 4, 2000 and Application No. JP2000-334610 filed in Japan on Nov. 1, 2000 under 35 U.S.C. §119; the entire contents of all are hereby incorporated by reference.

BACKGROUND OF THE INVENTION

1. Field of the Invention

The present invention relates to a recording apparatus, a communications apparatus, a recording system, a communications system, and methods therefor, and more specifically to a recording apparatus, a communications apparatus, a recording system, a communications system, and methods therefor which can restrict an image-capturing or sound recording process performed by the recording apparatus at an instruction of another communications apparatus, or set a reproducing condition and an image-capturing condition by automatically recognizing a user of the communications apparatus.

2. Description of the Related Art

The conventional camera leaves to an operator the determination as to whether or not image-capturing is permitted. Therefore, an image can be actually taken where image-capturing is prohibited.

Furthermore, the conventional sound recording device leaves to a user the determination as to whether or not recording is permitted. Therefore, a sound recording process can be actually performed where sound recording is prohibited.

As described above, there has been the problem that no effective restricting method can be used when common people are prohibited from image-capturing, for example, important cultural assets, etc., or when taking images of works of art, etc. using a flash is prohibited.

Additionally, there has been the problem that no effective prohibiting or restricting method can be used when common people are prohibited from recording sound of performances, for example, in a concert hall, etc.

In addition, copyrighted articles such as works of art, etc. are in many cases prohibited from being freely image-captured from the viewpoint of the protection of copyright. To have common people observe such restrictions, guards are assigned to watch an important place, people behave themselves, etc., but restrictions and regulations have not been completely observed.

Japanese Patent Application Publication Nos. 10-98765, 10-107875 and 10-243462 disclose the method of prohibiting the transmission of a signal using a portable telephone, etc.

Furthermore, there has conventionally been a method of obtaining permission to enter a strictly managed room using a key, an ID card, etc. Relating to a device such as a cash dispenser, etc., a user inputs a user ID card carried by the user and his or her own password memorized by the user to use the device. In addition, there has been a method of permitting or restricting the use of computers communicating with each other through a network by specifying a user by transmitting the account on the slave side and a unique password to the master side. In the local wireless communications technology, both communicators hold access keys to their own communications connection devices so that subsequent communications can be easily established.

Furthermore, the method of authenticating a person by capturing the physical characteristics such as the retina, fingerprints, etc. is generally known, and Japanese Patent Application Publication No. 5-342333 discloses the personal authentication device capable of improving the precision in authenticating a finger image of low density.

Additionally, Japanese Patent Application Publication No. 11-313237 discloses a digital camera and an image transmission system, to prevent the image transmitted from a digital camera from being viewed by an uncertain person on the reception side, provided with an authentication information addition device which adds a password or the information corresponding to it to the image data to be transmitted when the image is transmitted from the digital camera.

Furthermore, Japanese Patent Application Publication No. 11-313237 discloses an image processing device capable of easily specifying a user through an authentication medium and enhancing the security of image data depending on the authentication check result of a user, and capable of restricting the function available to the user.

However, since a camera does not normally have the function of authenticating a user, an image captured by a specific person can be freely viewed by others when a plurality of persons take images using cameras. Therefore, an image taken by a person can be viewed by other users.

The conventional method of specifying a person using a key, an ID card, a password, and an authentication medium requires a complicated operation when it is applied to a camera because it requests a user to perform an operation or input any data.

Furthermore, there has been the problem with a method of specifying a person according to a physical characteristic that it requires a complicated operation of presenting a physical characteristic such as a fingerprint, retina, etc. to the device, and that the authenticating device provided exclusively for the camera degrades the portability of the camera.

SUMMARY OF THE INVENTION

The present invention has been developed in view of the above mentioned circumstances, and its object is to provide an improved recording apparatus, communications apparatus, recording system, and methods therefor which can automatically set the recording function of the recording apparatus in a restricted state without a user's special care in a position where image-capturing, sound recording, etc. are restricted.

Furthermore, the present invention also aims at providing a communications apparatus and a communications system capable of automatically restricting the available function by automatically specifying a user who is using the communications apparatus or the electronic camera.

To attain the above mentioned object, the present invention includes a first communications device which can receive from another communications apparatus by wireless an image-capturing condition of restricting an image-capturing process or a sound recording condition of restricting a sound recording process, and a device of performing an image-capturing or sound recording process according to the received image-capturing condition or sound recording condition.

According to the present invention, since the recording apparatus includes a first communications device which can receive from another communications apparatus by wireless an image-capturing condition of restricting an image-capturing process or a sound recording condition of restricting a sound recording process, and a device of performing an image-capturing or sound recording process according to the received image-capturing condition or sound recording condition, the recording apparatus can automatically set the recording function of the recording apparatus in a restricted state without a user's special care in a position where image-capturing, sound recording, etc. are restricted.

Furthermore, to attain the above mentioned object, the present invention includes a recording device which records an image-capturing condition of restricting an image-capturing process by a recording apparatus carried by a user or a sound recording condition of restricting a sound recording process, and a communications device which can transmit the image-capturing condition or sound recording condition recorded in the recording device to the recording apparatus by wireless.

According to the present invention, since the communications apparatus includes a recording device which records an image-capturing condition of restricting an image-capturing process by a recording apparatus carried by a user or a sound recording condition of restricting a sound recording process, and a communications device which can transmit the image-capturing condition or sound recording condition recorded in the recording device to the recording apparatus by wireless, the communications apparatus can automatically set the recording function of the recording device carried by the user in a restricted state in a position where image-capturing, sound recording, etc. are restricted.

To attain the above mentioned object, the present invention also includes a communications device which can receive a reproducing condition of restricting the function of reproducing an image from another communications apparatus by wireless, and a reproducing device which reproduces an image according to the received reproducing condition.

According to the present invention, since the communications apparatus includes a communications device which can receive a reproducing condition of restricting the function of reproducing an image from another communications apparatus by wireless, and a reproducing device which reproduces an image according to the received reproducing condition, an available function can be restricted by easily specifying a user of the communications apparatus.

Furthermore, to attain the above mentioned object, the present invention includes a recording device which records in advance first identification information for specifying a first user of a communications apparatus, a communications device which can receive second identification information from another communications apparatus by wireless, associated with a reproducing condition of restricting the function of reproducing an image, for specifying a second user of a communications apparatus, a matching device which compares the first identification information specifying the first user with the second identification information specifying the second user, and a reproducing device which reproduces an image according to a comparison result.

Since the present invention includes a recording device which records in advance first identification information for specifying a first user of a communications apparatus, a communications device which can receive second identification information from another communications apparatus by wireless, associated with a reproducing condition of restricting the function of reproducing an image, for specifying a second user of a communications apparatus, a matching device which compares the first identification information specifying the first user with the second identification information specifying the second user, and a reproducing device which reproduces an image according to a comparison result, an available function can be restricted by simply specifying a user of the communications apparatus.

Furthermore, to attain the above mentioned object, the present invention includes a recording device which records an image and a first reproducing condition of restricting the function of reproducing the image, a reception device which receives a second reproducing condition of restricting the function of reproducing an image from another communications apparatus; a matching device which compares the first reproducing condition with the second reproducing condition, and a reproducing device which reproduces an image according to a comparison result.

Since the present invention includes a recording device which records an image and a first reproducing condition of restricting the function of reproducing the image with them associated with each other, a reception device which receives a second reproducing condition of restricting the function of reproducing an image from another communications apparatus; a matching device which compares the first reproducing condition with the second reproducing condition, and a reproducing device which reproduces an image according to a comparison result, an available function can be restricted by easily specifying a user of the communications apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 shows a wireless image-capturing system capable of restricting image-capturing by an electronic camera;

FIG. 4 is a flowchart of a communications process performed by an electronic camera and a communications apparatus;

FIG. 5 shows a communications system configured by the electronic camera and the communications apparatus according to the present invention;

FIG. 9 is a table of unique identification information about a user of an electronic camera issued by the electronic camera or a portable telephone;

FIG. 10 is a table of a basic authentication code recorded by a recording device of a server;

FIG. 11 is a table of information as to whether or not each electronic camera recorded by the recording device of the server can be used;

FIG. 12 is a flowchart of a pairing process performed by the electronic camera and the portable telephone;

FIG. 13 is a flowchart of a process of authenticating a user when the communications are started between the electronic camera and the portable telephone;

DETAILED DESCRIPTION OF THE PREFERRED EMBODIMENTS

Hereunder a preferred embodiment will be described in detail for a structure of a recording apparatus, a communication apparatus, a recording system, a communications system, and the methods therefor according to preferred embodiments of the present invention in accordance with the accompanied drawings.

FIG. 1 shows the wireless image-capturing system capable of restricting image-capturing by an electronic camera.

In FIG. 1, the present invention comprises an electronic camera 10 which is an embodiment of a recording apparatus carried by a user and capable of establishing wireless communications with other communications apparatuses; a portable telephone 12; a wireless communications range 14 in which image-capturing is restricted in an art gallery, a museum, etc.; and a communications apparatus 16 which is provided in an art gallery, a museum, etc. and can transmits and receives information to and from the electronic camera 10 and a communications apparatus such as the portable telephone 12, etc. in the wireless communications range 14.

When a user requests to take an image in an art gallery or a museum in which image-capturing is permitted or restricted on an accounting condition, the user pays a use rate for image-capturing to the art gallery or the museum to acquire the permission to take images. The communications apparatus 16 specifies the electronic camera 10 of the user who paid the use rate, and transmits the information about the recording condition such as an image-capturing condition, sound recording condition, etc. to the electronic camera 10. The electronic camera 10 which receives the information about the image-capturing condition is permitted to take images with the image-capturing function restricted according to the specified image-capturing condition, and the user can take images without considering the image-capturing condition. Furthermore, in an art gallery and a museum where image-capturing is prohibited, the wireless communications apparatus 16 transmits the sound recording condition of prohibiting image-capturing using the electronic camera 10. Therefore, a user cannot take images using the electronic camera 10 although he or she requests to take images.

When voice is recorded in a concert hall in which sound recording is permitted or restricted on an accounting condition using the electronic camera 10, the recording condition such as a sound recording condition, etc. is received from the communications apparatus 16 as in the above mentioned image-capturing process, and the sound recording process can be performed on the specified sound recording condition. The sound recording process performed where sound recording is prohibited is suppressed on the recording condition received from the communications apparatus 16.

Figure 2:
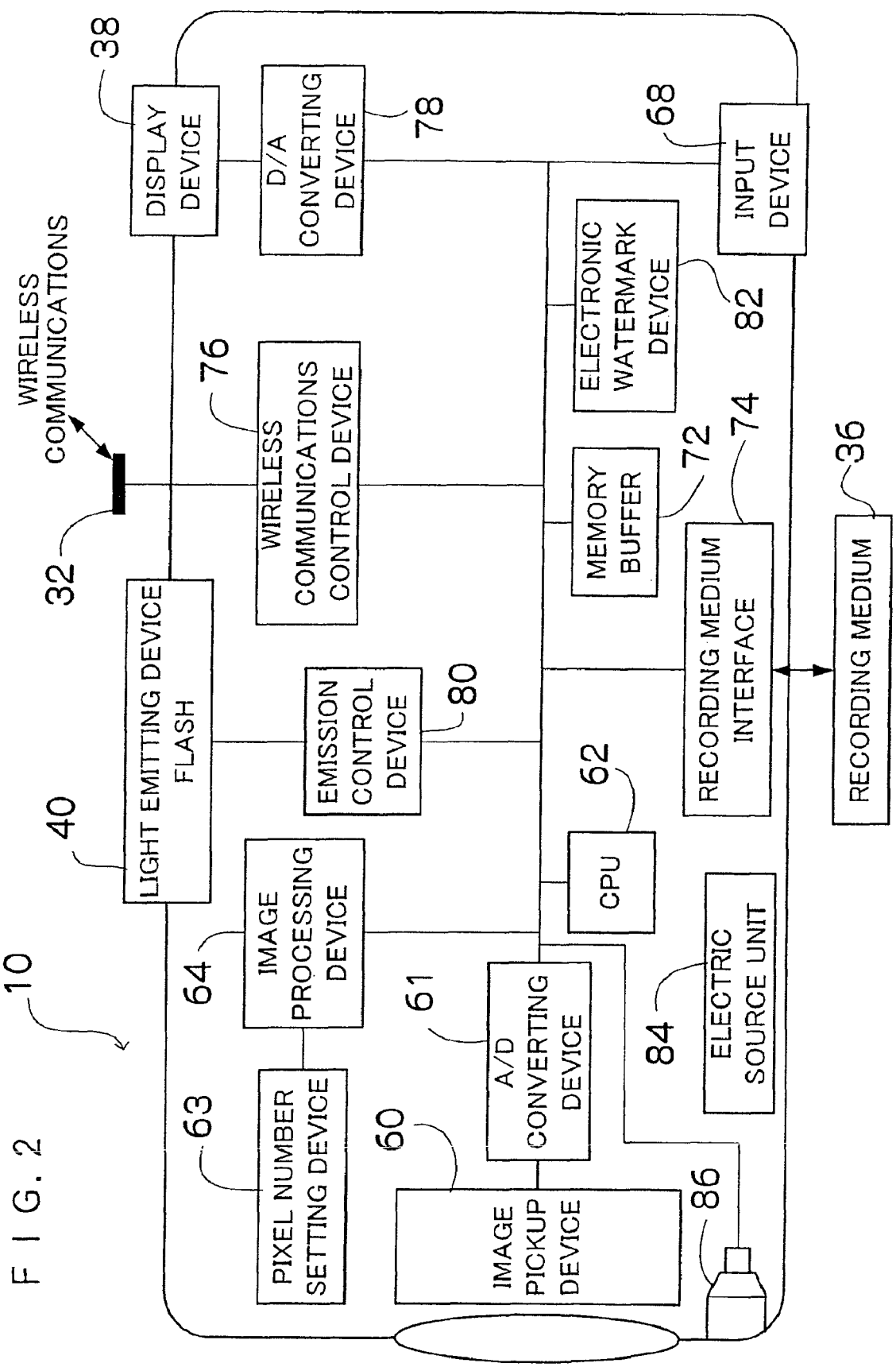
FIG. 2 is a block diagram of a signal processing system of an electronic camera.

FIG. 2 is a block diagram of the signal processing system of the electronic camera according to the present invention.

In FIG. 2, the electronic camera 10 comprises an image pickup device 60 which is an image-capturing device configured by a solid-state image pickup device, etc. for outputting image data by forming a subject to be image-captured on a photo-receiving surface and photoelectric conversion; a D/A converting device 61 for converting analog data output from an image pickup device 60 into digital data; an information processing device (CPU) 62 for controlling the entire electronic camera 10, and simultaneously controlling sampling timing of image data the recording and transmission, communications, display, image-capturing and sound recording according to a recording condition, change of a wait state, etc. of image data; an pixel number setting device 63 for setting the number of pixels indicating the resolution of an image to be captured at an instruction of the information processing device; an image processing device 64 for changing an image size, amending sharpness, amending gamma, amending contrast, amending white-balance, etc.; a release button; a communications button; transmission button; a function switch; a cross key, a determination switch; a mode switch; etc.

Furthermore, the electronic camera 10 comprises: an input device 68 capable of inputting use rate information about an image-capturing or sound recording process by a user, or information about a condition of recording an image or voice; and a recording medium interface 74 for converting data so that a recording medium 36 which can be freely attached and detached can record and read image data and voice data. The recording medium 36 can be a semiconductor such as a memory card, an MO, etc., and a freely attached and detached recording medium for magnetic recording, optical recording, etc.

The information processing device 62 is connected to ROM storing unique information such as a model code, a production number, etc. of the electronic camera 10, identification information specifying an operation program, each constant, a user, etc., RAM which is a storage device as a work area when a program is executed, and memory 72 configured by frame memory for temporarily storing image data. Furthermore, the information processing device 62 has the function of a compression releasing device for controlling the compression of the information about the image data, etc. according to the information about the recording condition received from another communications apparatus, and controlling the extension and development of the compressed data.

A wireless communications device of the electronic camera 10 used when transmitting and receiving information to and from another communications apparatus is configured by a wireless communications control device 76 for transmitting or receiving image data through a carrier at an instruction from the information processing device 62, and an antenna 32 for transmitting and receiving the carrier and data.

The wireless communications device can transmit image data or voice data recorded in a recording medium, transmit a telephone number received from another communications apparatus such as a portable telephone, etc., unique identification information specifying a user, a password, etc., and transmit use rate information about an image-capturing or sound recording process performed by a user, acknowledgment information about a recording condition, etc. to another communications apparatus.

The wireless communications device can also receive the recording condition such as an image-capturing condition of restricting an image-capturing process or a sound recording condition of restricting a sound recording process, or receive the use rate information about an image-capturing or sound recording process. Furthermore, it can be provided with a communications device capable of receiving a telephone number from a communications apparatus such as a portable telephone, etc., the information such as a password, etc.

Furthermore, the electronic camera 10 also comprises a D/A converting device 78 for displaying on a display device 38 the information about communications situation, the accounting information about a use rate for an image-capturing process, the acknowledgment information, the restricting information about an image-capturing process, the information about a captured image, etc.; a light emitting device 40 such as a flash, etc. for emitting light to supplement the necessary amount of light for a subject to be image-captured; an emission control device 80 for controlling the emission timing and the amount of light emitted by the light emitting device 40; an electronic watermark device 82 for putting an electronic watermark into an image of a recorded and copyrighted article; an electric source unit 84 for supplying power to each control device of the electronic camera 10; and a microphone 86 for recording (or sound recording) collected voice through the information processing device 62.

The collected voice information is converted into digital data by an A/D converting device not shown in the attached drawings, the voice information can be compressed according to the recording condition received from the communications apparatus 16, and the resolution of the voice information can be set according to the recording condition.

Described below is the communicating process of the electronic camera 10 configured as described above. When power is supplied to the electronic camera 10, the wireless communications control device 76 receives information from the communications apparatus 16, and performs a process of establishing communications. If the communications apparatus 16 is not recognized, an image-capturing process can be normally performed on an image-capturing condition without restrictions. If the communications apparatus 16 is recognized, a pairing process is performed to establish subsequent communications with the communications apparatus 16, the information about the recording condition of restricting the image-capturing process and the sound recording process is received from the communications apparatus 16, and the received information is recorded in the memory 72.

Described below is the image-capturing process by the electronic camera 10.

An image to be captured is formed on a photo-receiving surface of the image pickup device 60. The formed subject is processed by a photo-electric conversion, processed by a D/A conversion, and output to the image processing device 64. Thus, the obtained image data is set to a predetermined number of recording pixels according to the recording condition by the pixel number setting device 63, the image processing device 64 performs the process of reducing the amplitude and noise, and the result is temporarily stored in the memory 72. The information processing device 62 transmits the image data stored in the memory 72 to the D/A converting device 78, and displays it on the display device 38.

When a release button in the input device 68 is pressed, a subject image-capturing or voice recording mode is entered. Then, the information processing device 62 reads information about the recording condition stored in the memory 72, and sets the image-capturing condition and the sound recording condition. If emission of a flash, etc. is permitted in the recording condition, the light emitting device 40 is instructed to emit light depending on the brightness of a subject so that an image can be captured, and the obtained image data is temporarily stored in the memory 72. The image data stored in the memory 72 is read by the information processing device 62, a process of compressing the image data is performed on a predetermined recording condition according to the recording condition, and the image data and voice data are sequentially recorded in the recording medium 36 through the recording medium interface 74. Furthermore, instead of recording the image data and voice data in the recording medium 36 through the recording medium interface 74, the image data and voice data can be output to another communications apparatus through the wireless communications control device 76.

Figure 3:
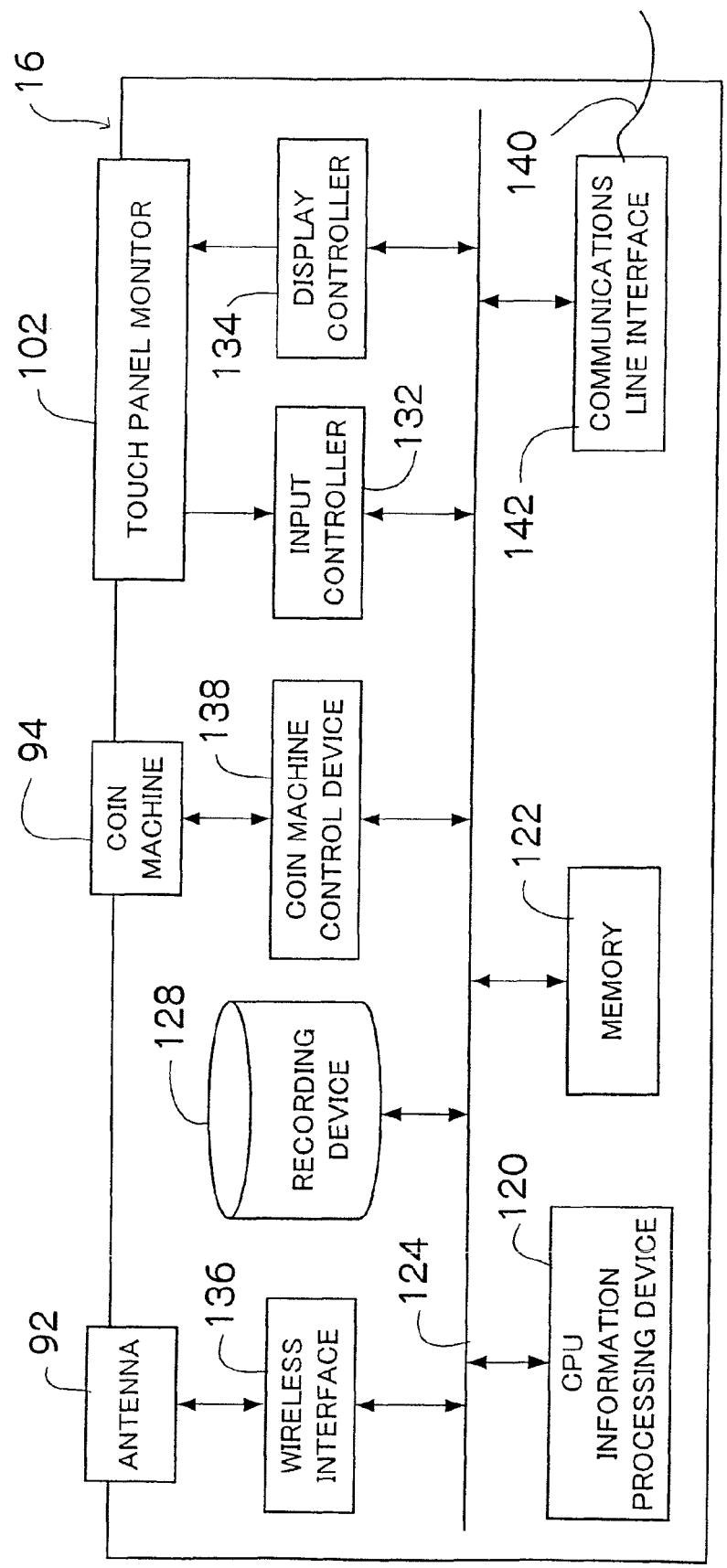
FIG. 3 is a block diagram of an information processing system of a communications apparatus.

FIG. 3 is a block diagram of the information processing system of the communications apparatus 16.

In FIG. 3, the information processing system of the communications apparatus 16 comprises: an information processing device 120 for controlling the entire communications apparatus 16, a change of a wait state, etc.; memory 122 configured by ROM in which a program for operating the information processing device 120, various constants, etc. are written, and RAM which is a work area for use by the information processing device 120 performing a process; a touch panel having the function of a display device for displaying the use rate information about an image-capturing process or a sound recording process or the information about a recording condition to notify a user of the information, and the function of an input device for use by a user inputting various information; and a recording device 128, such as a hard disk, which records information including large amounts of obtained images, an image-capturing information, an image-capturing condition of restricting an image-capturing and sound recording with a recording apparatus carried by a user.

The information input system of the communications apparatus 16 is provided with an input controller 132 for receiving information such as a password of a user of the electronic camera 10, identification information, etc. input through the input device of the touch panel 102, and transmitting the information to the information processing device 120. Furthermore, the image signal processing system of the communications apparatus 16 is provided with a display controller 134 for sequentially converting the information to be displayed on the display device of the touch panel 102 into a video signal of a predetermined frame rate, and transmitting the signal to the display device of the touch panel 102.

The wireless communications device of the communications apparatus 16 used when information is transmitted or received through communications to and from another communications apparatus is configured by a wireless interface 136 capable of transmitting information such as a recording condition, etc. recorded in the recording device 128 to a recording apparatus at an instruction from the information processing device 120, and receiving various information from a communications apparatus such as the electronic camera 10, etc.; and an antenna 92 for transmitting and receiving a carrier and data.

The wireless communications device can receive image data or voice data transmitted from, for example, the electronic camera 10, receive a telephone number transmitted from another communications apparatus such as a portable telephone, etc., information such as a password unique to a user, etc., and receive use rate information about an image-capturing or sound recording process performed by a user, acknowledgment information about a recording condition, etc.

The wireless communications device can transmit a recording condition, for example, an image-capturing condition of restricting an image-capturing process or a sound recording condition of restricting a sound recording process, etc. recorded in the recording device 128, and transmit use rate information, etc. about the image-capturing or sound recording process.

Furthermore, the communications apparatus 16 comprises: a coin machine 94 (rate reception device), provided with a slot for a coin, for controlling the process of received coins and changes; a coin machine control device 138 for transmitting the information about a received amount to the information processing device 120, receiving change information from the information processing device 120, and transmitting it to the coin machine 94; and a communications line interface 142 for establishing communications through a wire communications line 140 capable of receiving from another communications apparatus the accounting information about an image-capturing or sound recording process of a user.

Each of the peripheral circuits containing the information processing device 120, the memory 122, the input controller 132, the display controller 134, the recording device 128, the wireless interface 136, the coin machine control device 138, and the communications line interface 142 in the communications apparatus 16 is connected through a bus 124, and the information processing device 120 can control each of the peripheral circuits.

The communications device for use when the electronic camera 10 and the communications apparatus 16 establish wireless communications with each other uses an electric wave, an ultrasonic wave, infrared light, etc. as a carrier. When infrared is used for a communications device, the operability can be improved by a communications device capable of establishing communications in a wide range using diffused light.

In the wireless communications in an art gallery, a museum, a concert hall, etc., a comparatively low electric wave for a communications distance of 10 mm to 100 m is preferably used to restrict the wireless communications range 14. The communications apparatus 16 is provided in a place where it is necessary to restrict image-capturing such as an art gallery, a museum, a concert hall, etc., and is always searching for a communications apparatus to be connected to. The location of the communications apparatus 16 is around the center of the area where communications are controlled. If an area in which image-capturing by an electronic camera is to be restricted is large or includes a plurality of rooms, then a plurality of communications apparatus 16 are to be installed.

FIG. 4 is a table showing the flow of the communicating process performed by an electronic camera and a communications apparatus.

As shown in FIG. 4, the communications apparatus 16 starts wireless communications and search for a connected-to apparatus in the first step 1 'transmission by wireless, search for connected-to apparatus'. In this step, for example, the communications apparatus 16 functions as a master communications apparatus using an electric wave in transmitting and receiving information, and performs a process of waiting for a slave communications apparatus (a recording apparatus such as the electronic camera 10, a portable telephone 12, etc.) synchronizing with the frequency hopping pattern and the time slot.

In the next step 2 'supplying power, image-capturing and communications mode', a user enters the wireless communications range 14 with his or her electronic camera 10, and the process mode of the electronic camera 10 is set in an image-capturing mode. When the electronic camera 10 is set in the image-capturing mode, the electronic camera 10 returns a reply in synchronization with a synchronous signal issued by the communications apparatus 16.

In the next step 3 'detecting electronic camera, establishing wireless connection', the communications apparatus 16 detects the electronic camera 10 according to the reply from the electronic camera 10, establishes wireless communications, and enables information to be transmitted and received.

In the next step 4 'reading model code of electronic camera', the communications apparatus 16 reads information such as the model code, the unique number, etc. of the electronic camera 10, records the information in the recording device 128 of the communications apparatus 16, and enters the next step 5 'reading user specific information when portable telephone is available, transmitting accounting information'.

In steps 5 to 7 described later, an accounting process of paying the rate for image-capturing is performed. In step 5, for example, the user information such as the identification information specifying a user, a credit number, the phone number of a portable telephone, a password, etc., and the information about the payment of a use rate are received from the electronic camera 10 or the portable telephone 12 the user carries. Then, use rate information about image-capturing in the art gallery, the museum, etc. is transmitted. Instead of the communications apparatus 16 receiving the user information directly from the portable telephone 12, the electronic camera 10 and the portable telephone 12 can set in advance an authentication code to establish a local wireless communications so that the user information can be received from the electronic camera 10 and the portable telephone 12, and transmitted to the communications apparatus 16.

As a method of paying the use rate for image-capturing, the use rate for image-capturing and the information about the payment method can be displayed on the touch panel 102 of the communications apparatus 16 to show the user the use rate. As a method of receiving the use rate, the use rate can be put into the coin machine 94, or a prepaid card, etc. can be put into the coin machine 94 to pay the use rate.

In the next step 6 'selecting and acknowledging accounting', according to the accounting information received from the communications apparatus 16, the display device 38 of the electronic camera 10 displays the notification that the image-capturing is charged for, the accounting information which is the condition of taking images, and the recording condition (restricting information about image-capturing, etc.) such as restricted items about image-capturing, etc. According to the displayed recording condition, the user inputs a selected desired image-capturing condition or acknowledgment information about the accounting condition.

When the user does not accept (or rejects) the accounting condition about the image-capturing, the communications apparatus 16 reads the setting information for prohibiting the image-capturing or the recording condition of prohibiting the image-capturing for the number of pixels equal to or larger than a predetermined value from the recording device 128, and transmits the information or the condition to the electronic camera 10. The recording condition in accordance with the use rate, etc. which the user has accepted can be read from the recording device 128 and transmitted to the recording apparatus.

Furthermore, if the user accepts the accounting condition of the image-capturing, the electronic camera 10 transmits the acknowledgment information about the accounting to the communications apparatus 16. The contents of restricting the image-capturing can be the prohibition of image-capturing and recording, the prohibition of image-capturing using a flash, the prohibition of recording at or higher than a predetermined resolution or number of pixels, the prohibition or restriction against image-capturing by a specified model (a processional camera, a single lens reflex camera, etc.) of the electronic camera 10, the permission to take images with predetermined information (an electronic watermark, etc.) claiming a copyright inserted into image data, the settings of a compressing condition of a captured image, the settings of a condition of the resolution of captured image information, the restrictions on the sound issued by a recording apparatus after the image-capturing process, etc.

The prohibition of recording at or higher than the predetermined resolution or pixels refers to regulating an image-capturing condition of, for example, no settings for recording one million or more pixels on the camera side for a copyrighted image, automatic settings for the resolution of less than a million pixels (VGA, etc.).

The method of inserting predetermined information claiming a copyright into image data is to permit image-capturing with an electronic watermark, etc. by inserting a predetermined code claiming the copyright into image data to be recorded. An electronic watermark can be inserted into image data by randomizing the electronic watermark, or after a converting process (after the discrete cosine transform, or the Wavelet transform prescribed in JPEG2000) when an image is compressed, etc. The electronic watermark can be inserted on all image-capturing conditions or cases.

When a recording apparatus such as an electronic camera, etc. has the function of recording voice, the recording function can be prohibited or restricted. For example, the sound recording in a specific concert hall or conference can be prohibited or restricted. The restriction of the sound recording process may be the restriction of recording system relating to the quality of the recorded sound (the compressing system and condition on the voice information to be recorded, the condition of the resolution such as the number of bits of the voice information to be recorded, etc.).

After receiving the accounting information from the electronic camera 10, the communications apparatus 16 transmits the confirmation information about the accounting information and the information such as a recording condition, etc. to the electronic camera 10 in the next step 7 'confirming accounting, transmitting image-capturing restricting information'. In the next step 8 'receiving and setting image-capturing restricting information', the electronic camera 10 which receives the confirmation information about accounting, various information such as a recording condition, etc. temporarily stores various received information in the memory 72, displays it on the display device 38 to notify the user of the information. Then, the information processing device 62 of the electronic camera 10 sets the image-capturing or voice recording mode according to the received information about a recording condition.

In the next step 9 'image-capturing', an image-capturing or voice recording process is performed according to a user instruction to capture an image or record data and according to the set recording condition. The recorded image is recorded in the recording medium 36, and the information about the recording condition such as the number, the resolution, the size, the compression rate when the image is recorded, etc. of the images captured in step 10 'transmitting image number information' is transmitted from the electronic camera 10 to the communications apparatus 16.

In the next step 11 'accounting', after receiving the information about the image-capturing and recording processes from the electronic camera 10, the communications apparatus 16 charges a user a use rate according to the received information about the image-capturing and recording processes.

When a series of image-capturing processes is completed, the electronic camera 10 and the communications apparatus 16 complete the communications process in the next step 12 'completing connection'.

FIG. 5 shows the communications system configured by the electronic camera and the communications apparatus according to the present invention.

In FIG. 5, the communications system is configured by an electronic camera 1010 (an embodiment of a communications apparatus) provided with an image pickup device, a wireless communications device, etc.; a portable telephone 1040 which is a communications apparatus provided with a wireless communications device, a recording device, etc.; and a server 1090 which is a communications apparatus provided with a recording device for recording information, a wireless communications device, etc. The electronic camera 1010 can transmit and receive information to and from the portable telephone 1040 through the communications device for local wireless communications. The portable telephone 1040 can transmit and receive information to and from the server 1090 through the communications device such as a public line, etc.

For example, a user carries his or her own portable telephone 1040, and take images using the electronic camera 1010. At this time, the electronic camera 1010 automatically starts communications with the portable telephone 1040, automatically obtains from the portable telephone 1040 the first identification information unique to the user of the portable telephone 1040, and records the identification information with the captured images.

When an image is reproduced, the electronic camera 1010 automatically starts communications with the portable telephone 1040, automatically obtains from the portable telephone 1040 the second identification information unique to the user of the portable telephone 1040, and compares the obtained information with the first identification information recorded together with the captured images. As a comparison result, if the first identification information recorded with the images is the same as the newly received second identification information, and it is determined that the operator is the same as the person who reproduces the images, then a state in which a high resolution image can be reproduced can be set.

As a comparison result, if the first identification information is not the same as the second identification information, then it is determined that the operator is not a person who reproduces the images, and reproducing images is prohibited, or reproducing is permitted only at a low resolution level as necessary.

Figure 6:
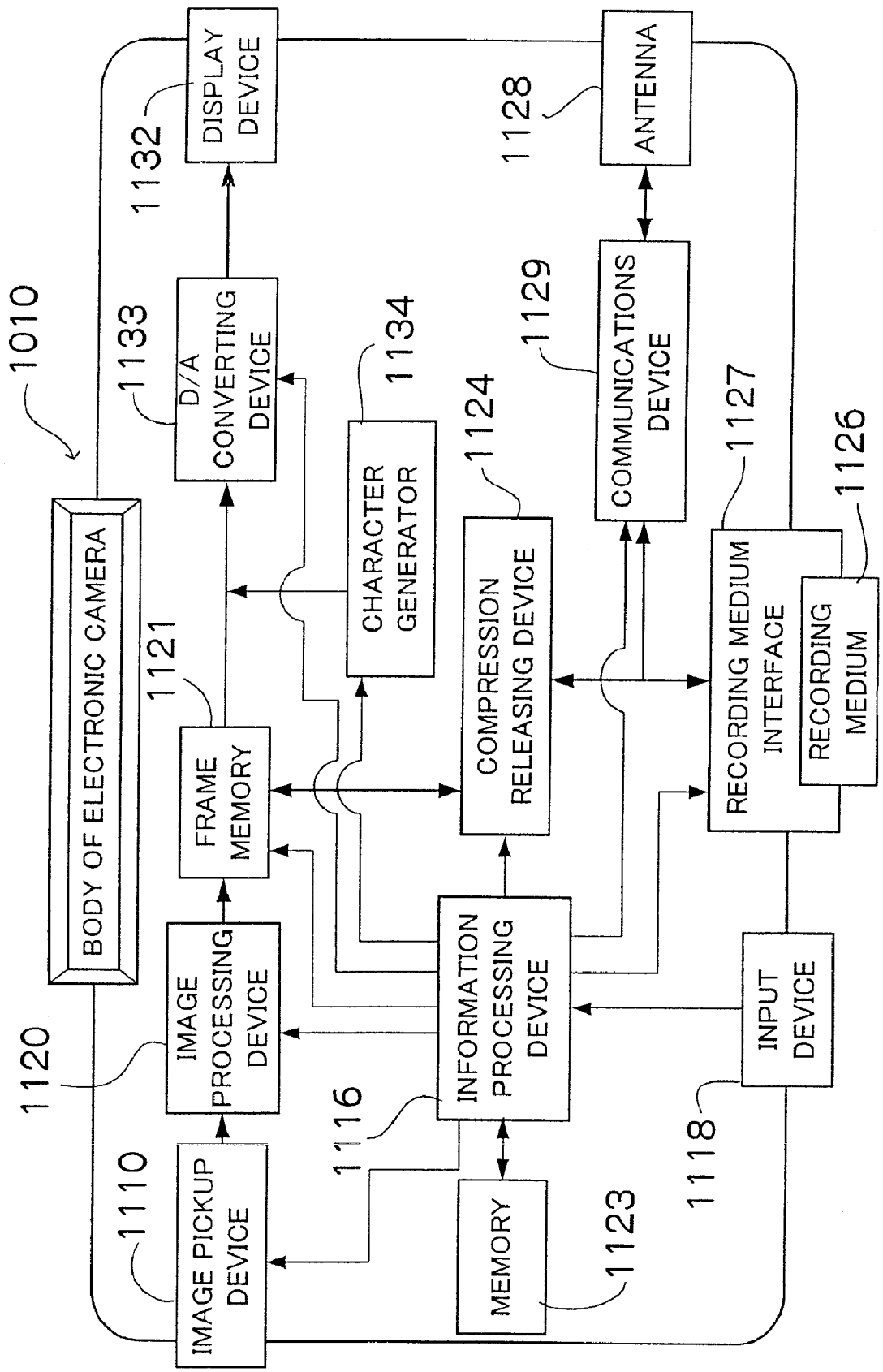
FIG. 6 is a block diagram of a signal processing system of an electronic camera.

FIG. 6 is a block diagram of the signal processing system of an electronic camera.

In FIG. 6, the electronic camera 1010 is provided with: an image pickup device (including a part of the functions of an image-capturing device) 1110 for outputting image data by forming an image of a subject on a photo-receiving surface and performing a photoelectric conversion on the image; an information processing device 1116 for controlling the entire electronic camera 1010, the sampling timing of image data, recording image data, recognizing graphics of image data, reading model information about the electronic camera 1010, communications, display, matching check of identification information, etc.; and an input device 1118 provided with a release button, a communications button, a transmission button, a function switch, a cross key, a confirmation switch, a mode switch, etc.

The electronic camera 1010 is also provided with an image processing device 1120 for changing the size of an image, amending sharpness, amending gamma, amending contrast, amending white balance, etc., frame memory 1121 temporarily storing image data, and memory 1123 comprising PROM storing the unique number of the electronic camera 1010 such as a model name, a production number, etc., identification information, an operation program, the identification information and password identifying the owner of the electronic camera 1010, various constants, etc. and RAM which is a storage device as a work area when the program is executed.

The electronic camera 1010 is also provided with a compression releasing device 1124 for controlling the compression of information such as image data, etc. in the method represented by the JPEG and the motion JPEG, and controlling the extension and development of the compressed data, and a recording medium interface 1127 (recording device) for converting data so that image data can be recorded in or read from an attachable and detachable recording medium 1126. The recording medium 1126 is an attachable and detachable recording medium represented by a semiconductor, magnetic recording, and optical recording media such as a memory card, MO, etc.

The wireless communications device of the electronic camera 1010 used when information such as image data, etc. is transmitted and received to and from another communications apparatus such as the portable telephone 1040, etc. through communications is configured by an antenna 1128 for transmitting and receiving a carrier and data, and a communications device 1129 for transmitting or receiving image data through a carrier at an instruction of the information processing device 1116.

The electronic camera 1010 is also provided with a D/A converting device 1133 for displaying the information about the communications connection device and image data on a display device 1132, and a character generator 1134 for converting the identification information specified by the information processing device 1116 into the data of displayed characters and messages.

Described below is the image-capturing process by the electronic camera 1010 with the above mentioned configuration.

When power is applied to the electronic camera 1010 and the image-capturing mode is entered, the information processing device 1116 of the electronic camera 1010 first enters an 'unauthenticated mode' which is an image-capturing mode of restricting the function of image-capturing an image. Then, the information processing device 1116 instructs the communications device 1129 to start local wireless communications. After starting the wireless communications, it searches for a communications apparatus which can be provided with an 'authentication code' indicating an image-capturing condition. If, near the electronic camera 1010, there is the portable telephone 1040, etc. which is owned by the user of the electronic camera 1010 and can be provided with the image-capturing condition, then wireless communications are established according to the reply from the portable telephone 1040, and the pairing process for continuing the subsequent communications is started. Then, it transmits to a communications apparatus such as the portable telephone 1040, etc. identification information (containing the identification information specifying the user of the electronic camera 1010) unique to the electronic camera 1010 such as an ID number, a production number, a serial number, etc. stored by the memory 1123, etc. (recording unit) which is a recording device of the electronic camera 1010 through the communications device 1129 which is a transmission device.

In the next step, the electronic camera 1010 requests the portable telephone 1040 to transmit an 'authentication code' (an embodiment of an image-capturing condition of restricting the image-capturing function which can be identification information specifying a user or an owner, and can be identification information associated with the image-capturing condition). The information processing device 1116 (having a part of the functions of the image-capturing device, and also having the function as a matching device) of the electronic camera 1010 checks whether or not the 'authentication code' received by the communications device 1129 by wireless from the portable telephone 1040 matches the identification information recorded in the memory which is the recording device of the electronic camera 1010. If the 'authentication code' matches the identification information as a result of the matching check, then the information processing device 1116 sets the image-capturing mode as an 'authenticated mode' in which the image-capturing function is not restricted so that the subsequent image-capturing process is performed in each image-capturing mode.

On the other hand, an image captured by the electronic camera 1010 is formed on the photo-receiving surface of the image pickup device 1110, and the formed image of the subject is photoelectrically converted and output to the image processing device 1120. Thus, the obtained image data is processed by the image processing device 1120 for amplification and noise reduction, and temporarily stored in the frame memory 1121. The information processing device 1116 sequentially transmits the image data stored in the frame memory 1121 to the D/A converting device 1133, and displays it on the display device 1132.

When the release button provided in the input device 1118 is pressed, a mode of image-capturing a subject is entered. Then, the information processing device 1116 transfers the image data stored in the frame memory 1121 to the compression releasing device 1124, and outputs an instruction to perform the process of compressing the image data on a predetermined image-capturing condition. Then, the information processing device 1116 performs the process of instructing the recording medium interface 1127 to record the image data in the recording medium 1126. At this time, an authentication code storage unit of an image file also records the identification information unique to the electronic camera 1010 or the identification information (telephone number of a portable telephone, information about a serial key, etc.) about the portable telephone 1040 specifying the operator.

The authentication code storage unit recording the 'authentication code' can be the header portion of the image file, or can be embedded as a pattern of a 'watermark' into an image itself. The image-capturing condition in the 'unauthenticated mode' can permit only an image coarser than the VGA size to be recorded, can prohibit image-capturing an image with the number of pixels larger than a predetermined value, or can permit image data containing less image information having a compression rate higher than a predetermined rate to be recorded. Furthermore, the image-capturing condition in the 'authentication mode' can permit image-capturing an image at the maximum resolution, or can permit recording image data containing a larger volume of information at a low compression rate.

The image-capturing condition in the 'unauthenticated mode' can be an image-capturing condition of completely prohibiting an image-capturing process, a condition of setting a time at which image-capturing is restricted, an image-capturing condition of prohibiting a flash, an image-capturing condition of prohibiting image-capturing in a specific type of recording apparatus (an electronic camera, etc.), an image-capturing condition of inserting predetermined information such as a 'watermark', etc. with which a copyright is claimed for the captured image, a condition on the resolution of image information about a captured image, an image-capturing condition of restricting a calling tone issued by a recording apparatus after image-capturing an image, etc.

When a captured image is transferred to another communications apparatus, communications are established with another communications apparatus which is a destination of an image, and a transmission button provided in the input device 1118 is pressed. Then, the information processing device 1116 sequentially reads specified image data from the recording medium 1126, converts the data into a predetermined data format applicable to a predetermined image-capturing condition, and transmits the result to another communications apparatus through the communications device 1129 and the antenna 1128.

Described below is the reproducing process performed by the electronic camera 1010 with the above mentioned configuration.

When the process mode of the electronic camera 1010 is set as a 'reproducing mode', the information processing device 1116 of the electronic camera 1010 is first set as the 'unauthenticated mode' which is a reproducing mode of restricting the function of reproducing an image. Then, the information processing device 1116 instructs the communications device 1129 to start local wireless communications. Then, it starts the wireless communications, and searches for a communications apparatus which can be provided with an 'authentication code' corresponding to the reproducing condition. If, near the electronic camera 1010, there is the portable telephone 1040, etc. which is owned by the user of the electronic camera 1010 and can be provided with the image-capturing condition, then wireless communications are established according to the reply from the portable telephone 1040, and the pairing process for continuing the subsequent communications is started. Then, it transmits to a communications apparatus such as the portable telephone 1040, etc. identification information unique to the electronic camera 1010 such as an ID number, a production number, a serial number, etc. stored by the memory 1123, etc. which is a recording device of the electronic camera 1010.

In the next step, the electronic camera 1010 requests the portable telephone 1040 to transmit an 'authentication code' (an embodiment of a reproducing condition of restricting an image reproducing function which can be identification information specifying a user or an owner who is performing a reproducing process, and can be identification information associated with the image-capturing condition). It is checked whether or not the 'authentication code' the electronic camera 1010 receives from the portable telephone 1040 matches the identification information similar in format to the 'authentication code' recorded in the memory 1123 of the electronic camera 1010 or the image file for which reproducing is specified. If the 'authentication code' matches the identification information as a result of the matching check, then the information processing device 1116 sets the reproducing mode as an 'authenticated mode' in which the reproducing function is not restricted so that the subsequent reproducing process is performed in each reproducing mode. If the 'authentication code' which is a reproducing condition of restricting the reproducing function is not recorded in the image file, then it is determined that the image data is not restricted in a reproducing process, the 'authenticated mode' is set, and the main recorded image is reproduced and displayed as is.

In the image reproducing mode, the display device 1132 of the electronic camera 1010 displays a list of image files recorded in the recording medium 1126. The displayed list of image files can be displayed by characters, or a reduced image display with the main image reduced (referred to as a thumbnail image) so that a user can easily understand the display.

A user operates the input device 1118 while referring to the list of image files displayed on the display device 1132 to select an image to be reproduced. The file information about the image selected by the user is transmitted to the information processing device 1116, and the information processing device 1116 reads the image file selected by the user from the recording medium 1126. The read image data is converted into image data for display by the compression releasing device 1124, and transmitted to the information processing device 1116. If an 'authentication code' is embedded in the image data, the compression releasing device 1124 reads the 'authentication code'.

The information processing device 1116 converts image data depending on whether the current reproducing mode of the electronic camera 1010 is the 'unauthenticated mode' of restricting the process of reproducing an image, or the 'authenticated mode' of not restricting the process of reproducing an image, and the converted data is stored in the frame memory 1121.

The image data stored in the frame memory 1121 is sequentially transmitted to the D/A converting device 1133, and displayed on the display device 1132.

The reproducing condition in the 'unauthenticated mode' can be a condition of reproducing an image equal to or coarser than, for example, the VGA size, a condition of displaying only a reduced image, or a condition of reproducing only an image captured in an unauthenticated mode. In addition, a reproducing condition in the 'unauthenticated mode' can be a reproducing condition of prohibiting all reproducing processes, a reproducing condition of prohibiting a process of reproducing an image of equal to or larger than a predetermined number of pixels, a reproducing condition of inserting predetermined information such as a 'watermark', etc. claiming a copyright on an image, a condition of compression when an image is output, or a condition about the resolution of an image to be reproduced.

Furthermore, the reproducing condition in the 'authenticated mode' can be a condition of setting a reproducing time, a reproducing condition of reproduction at the maximum resolution, a condition of permitting an image for which the 'authentication code' is not recorded to be reproduced, or a condition of permitting only a reduced image to be displayed when the 'authentication code' recorded in an image file is different from the 'authentication code' received from the portable telephone 1040 when an image is reproduced.

Figure 7:
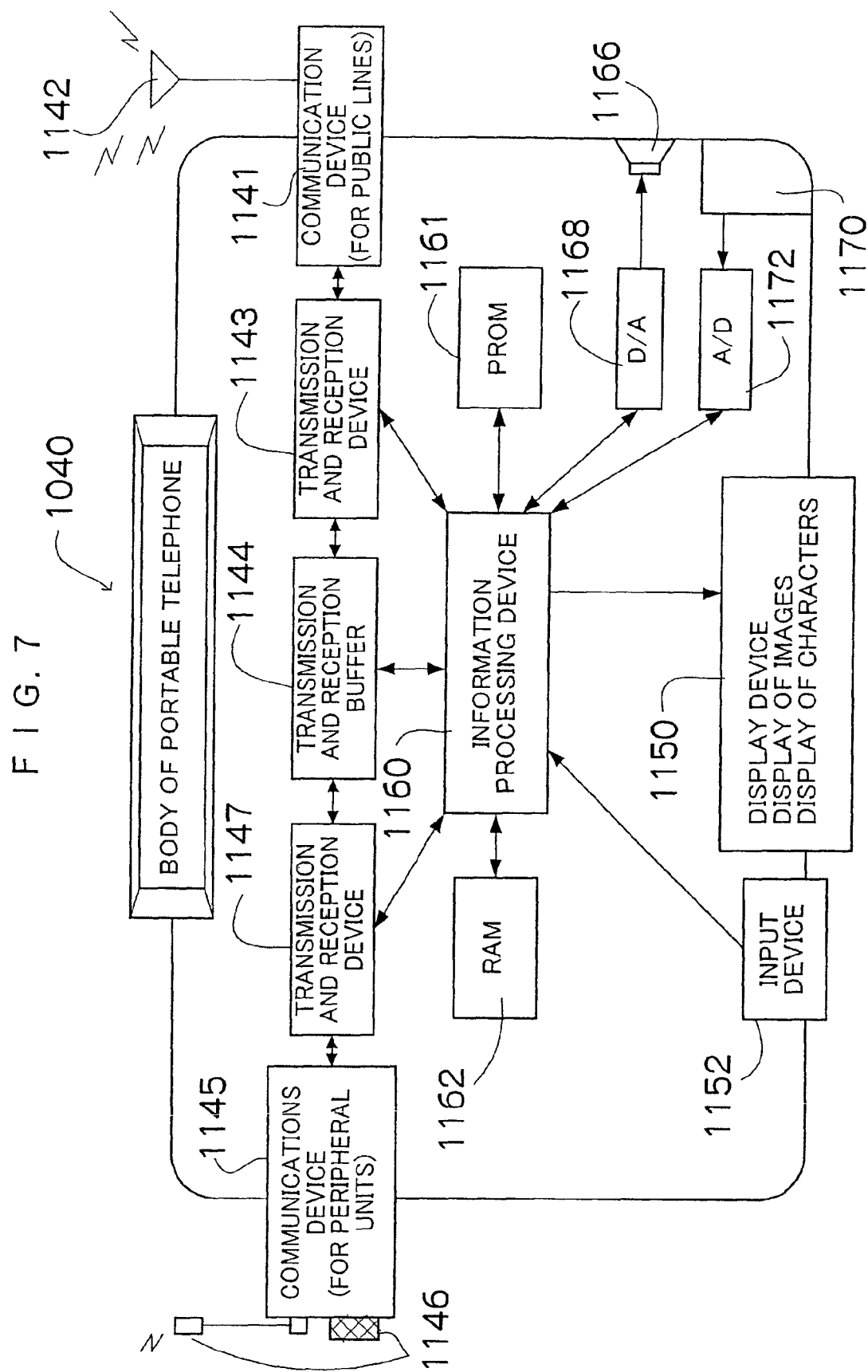
FIG. 7 is a block diagram of a signal processing unit of a portable telephone.

FIG. 7 is a block diagram of the signal processing unit of a portable telephone.

In FIG. 7, the information transmission and reception unit of the portable telephone 1040 is configured by a communications device 1141 for a public line for wireless communications with a public line, a transmission and reception device 1143 for wireless communications, a transmission and reception buffer 1144 for temporarily storing information to be transmitted and received in real time when a public line and local communications are established, a communications device 1145 for establishing wireless communications with a communications apparatus located close to the portable telephone 1040, an antenna 1146, and a transmission and reception device 1147.

The portable telephone 1040 is provided with a display device 1150 for displaying information such as a communications situation, the intensity of an electric wave, available capacity of a battery, a telephone number, an image, etc., and an input device 1152 for inputting information when a telephone number or an image is selected, information to be transmitted or received is selected, etc.

Furthermore, the portable telephone 1040 is provided with an information processing device (CPU) 1160 for controlling the entire portable telephone 1040, PROM 1161 storing a program for operating the information processing device 1160, various constants, a telephone number, identification information unique to an owner, a communications address, etc., RAM 1162 of a storage device which is a work area when the information processing device 1160 performs a process, a D/A converting device 1167 for converting digital voice data into analog voice data to drive a speaker 1166, and an A/D converting device 1169 for converting voice data input from a microphone 1168 into digital data.

Each of the peripheral circuits in the portable telephone 1040 containing the information processing device 1160, the transmission and reception device 1143, the transmission and reception device 1147, the display device 1150, the input device 1152, the PROM 1161, and the RAM 1162 is connected through the communications device such as a bus line, an I/O, etc., and the information processing device 1160 can control each of the peripheral circuits.

The communications device 1145 for the peripheral devices transmits and receives information to and from another communications apparatus through a communications device using an electric wave, an ultrasonic wave, infrared light, etc. When an electric wave is used, the communications specification of 'Bluetooth' which has recently attracted much attention can be adopted. When infrared light is used, the specification of IrDA can be effective.

Described below is a series of processes in which an 'authentication code' indicating the image-capturing condition or the reproducing condition is transmitted to the electronic camera 1010.

Upon establishment of the wireless communications with the electronic camera 1010, the communications device 1145 of the portable telephone 1040 for local communications notifies that it is a communications apparatus to which the 'authentication code' indicating an image-capturing condition or a reproducing condition can be transmitted. Then, the device starts the pairing process for continuing the subsequent communications with each other.

The communications device 1145 of the portable telephone 1040 receives from the electronic camera 1010 the identification information specifying the electronic camera 1010 such as a unique ID, a production number, a serial number, etc., or the identification information specifying the owner of the electronic camera 1010. The information processing device 1160 of the portable telephone 1040 reads the telephone number of the portable telephone 1040, the identification information unique to the owner of the portable telephone 1040, etc., and transmits them together with the identification information received from the electronic camera 1010 to a communications apparatus such as a specific server 1090, etc. through the communications device 1141 for a public line. In addition, a request to issue an 'authentication code' can be transmitted to the server 1090 as necessary.

Furthermore, instead of the portable telephone 1040 receiving and obtaining the identification information unique to the apparatus from the electronic camera 1010, a user can input identification information about the electronic camera 1010 or a code for authentication into the portable telephone 1040, and records it in the recording device such as the PROM 1161 of the portable telephone 1040. In this case, the information processing device 1160 of the portable telephone 1040 reads the identification information unique to the portable telephone 1040 and the identification information unique to the electronic camera 1010 from the PROM 1161, and transmits them to a communications apparatus such as the specific server 1090, etc. through the communications device 1141 for a public line.

The server 1090 issues a 'authentication code' which is the image-capturing condition or the reproducing condition of the electronic camera 1010 to the portable telephone 1040 according to the identification information about the electronic camera 1010 and the portable telephone 1040 transmitted by the portable telephone 1040. The 'authentication code' can be information associating the reproducing condition or the image-capturing condition of the electronic camera 1010 with the identification information issued by the portable telephone 1040 to specify the user of the electronic camera 1010. Furthermore, the identification information issued by the portable telephone 1040 can be the telephone number, etc. of the portable telephone 1040. The information processing device 1160 of the portable telephone 1040 which has received the 'authentication code' through the communications device 1141 records the received 'authentication code' in the recording device of the PROM 1161, etc., and transmits it to the electronic camera 1010 through the local communications device 1145.

Figure 8:
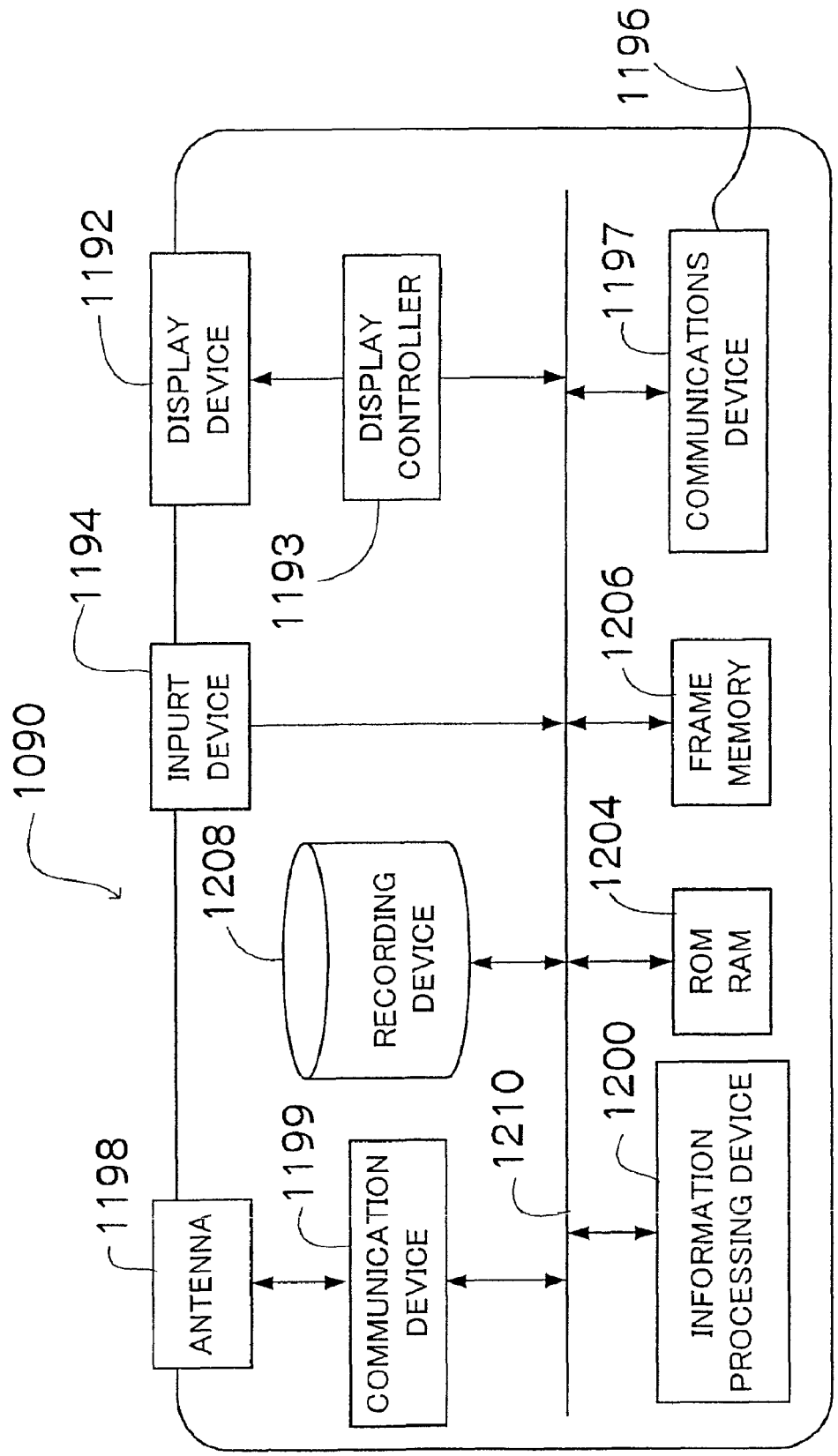
FIG. 8 is a block diagram of a signal processing unit of a server.

FIG. 8 is a block diagram of the signal processing unit of the server.

In FIG. 8, the server 1090 is provided with a display device 1192 for displaying the information about the operation situation, communications situation, images, etc. of the server 1090, a display controller 1193 for sequentially outputting the information displayed on the display device 1192, and an input device 1194 through which a user inputs information when he or she selects an image, information to be transmitted or received, etc.

The information transmission and reception unit of the server 1090 is provided with a communications device 1197 for establishing communications with a communications network 1196 such as a public line, etc., an antenna 1198 for wireless communications with another communications apparatus, and a communications device 1199 for use in performing wireless communications.

The server 1090 is also provided with an information processing device (CPU) 1200 for controlling the entire server 1090, memory 1204 configured by ROM storing a program for operating the information processing device 1200, various constants, a telephone number, identification information unique to an owner, a communications address, etc. and RAM of a storage device which is a work area when the information processing device 1200 performs a process, frame memory 1206 for temporarily storing an image displayed on the display device 1192, and a recording device 1208 for recording the identification information, etc. specifying the reproducing condition or the recording condition and a user of each electronic camera.

The peripheral circuits in the server 1090 containing the information processing device 1200, the display controller 1193, the input device 1194, the communications device 1197, the communications device 1199, the memory 1204, and the frame memory 1206 are connected through a bus line 1210 and the communications device such as an I/O, etc., and the information processing device 1200 can control each peripheral circuit.

The recording device 1208 can record the reproducing condition of restricting the reproducing function of a plurality of cameras associated with the identification information specifying a user of each electronic camera or the identification information specifying each electronic camera 1010, and can record the image-capturing condition of restricting the image-capturing function of a plurality of cameras associated with the identification information specifying a user of each electronic camera or the identification information specifying each electronic camera.

Furthermore, the communications device 1197 or 1199 of the server 1090 can receive unique identification information specifying each electronic camera, identification information specifying the user of the electronic camera 1010, the telephone number of the portable telephone 1040 or unique identification information specifying the owner of the portable telephone 1040, etc. Furthermore, the communications device 1197 or 1199 of the server 1090 can transmit to the portable telephone 1040, etc. the reproducing condition and the image-capturing condition of the electronic camera recorded in the recording device 1208 as associated with the identification information specifying the user of each electronic camera or each electronic camera by selecting the conditions according to the received identification information.

FIG. 9 is a table of the identification information unique to the user of the electronic camera 1010 issued by the electronic camera 1010 or the portable telephone 1040.

As shown in FIG. 9, the telephone number (described as the portable telephone number in FIG. 9) of each portable telephone is issued to each user of a plurality of electronic cameras 1010.

FIG. 10 is a table of 'basic authentication codes' recorded in the recording device 1208 of the server 1090.

As shown in FIG. 10, each of the electronic cameras A to E records the identification information unique to each camera associated with the 'basic authentication code'.

FIG. 11 is a table of the information, recorded by the recording device of the server 1090, as to whether or not each electronic camera is available.

As shown in FIG. 11, a user is associated with an electronic camera available to the user. The mark 'O' shows that the electronic camera 1010 is available in the 'authenticated mode', and the mark 'X' shows that it is only available in the 'unauthenticated mode'.

Described below is the case in which 'user a' captures or reproduces an image using a 'camera A' when the information shown in the tables in FIGS. 9 to 11 is recorded in the server 1090.

First, the portable telephone 1040a owned by the 'user a' obtains the serial number '12345678' unique to the apparatus from the 'camera A'. The 'camera A' stores the identification information 'AAAA' unique to the apparatus for authentication in addition to the serial number. The portable telephone 1040a transmits to the server 1090 the telephone number '09011112222' of the portable telephone which is the identification information about the portable telephone 1040a specifying the 'user a' together with the received serial number unique to the camera, and requests the server 1090 to issue an 'authentication code'.

When the server 1090 receives the portable telephone number and the serial number unique to the electronic camera 1010, it refers to the table shown in FIG. 11, and obtains the information that the 'user a' can use the 'camera A' in the 'authenticated mode'. The information processing device 1200 of the server 1090 transmits to the portable telephone 1040a through the communications device 1197 or 1199 the information 'AAAA09011112222' obtained by combining the 'basic authentication code' recorded in the recording device with the portable telephone number specifying the 'user a' as an 'authentication code'.

The portable telephone 1040a receives the 'authentication code' through the communications device of a public line, etc., and transmits the 'authentication code' through the wireless local communications device to the 'camera A'. Upon receipt of the 'authentication code', the 'camera A' compares the identification information unique to the apparatus stored in the recording device of the 'camera A' with the identification information 'AAAA' unique to the apparatus contained in the higher order of the received 'authentication code'. The information '09011112222' contained in the lower order of the 'authentication code' can also be used to authenticate the user.

If it is determined that the identification information recorded by the 'camera A' matches the identification information contained in the 'authentication code' received from the portable telephone 1040a as a comparison result, then the image-capturing or reproducing mode of the 'camera A' is set as the 'authenticated mode', and the subsequent processes are performed. If it is determined that the identification information recorded by the 'camera A' does not match the identification information contained in the 'authentication code' received from the portable telephone 1040a as a comparison result, then the image-capturing or reproducing mode of the 'camera A' is set as the 'unauthenticated mode', and the subsequent processes are performed.

When the 'camera A' captures an image, the authentication code storage unit of an image file records the identification information unique to the 'camera A' and the identification information specifying the operator. Thus, when the recorded image is reproduced, the reproduction mode is set according to the 'authentication code' (information about the reproducing condition) recorded in the image file.

Described below is the case in which 'user b' captures or reproduces an image using a 'camera C' when the information shown in the tables in FIGS. 9 to 11 is recorded in the server 1090.

First, the portable telephone 1040b owned by the 'user b' obtains the serial number '12341234' unique to the apparatus from the 'camera C'. The 'camera C' stores the identification information 'CCCC' unique to the apparatus for authentication in addition to the serial number. The portable telephone 1040b transmits to the server 1090 the telephone number '09011113333' of the portable telephone which is the identification information about the portable telephone 1040b specifying the 'user b' together with the received serial number unique to the camera, and requests the server 1090 to issue an 'authentication code'.

When the server 1090 receives the portable telephone number and the serial number unique to the electronic camera 1010, it refers to the table shown in FIG. 11, and obtains the information that the 'user b' cannot use the 'camera C' in the 'authenticated mode'. The information processing device 1200 of the server 1090 transmits to the portable telephone 1040b through the communications device 1197 or 1199 the unavailability notification about the 'camera C'.

The portable telephone 1040b receives the unavailability notification through the communications device of a public line, etc., and transmits the unavailability notification through the wireless local communications device to the 'camera C'. Upon receipt of the unavailability notification, the 'camera C' sets the image-capturing or reproducing mode of the 'camera C' as the 'unauthenticated mode', and the subsequent processes are performed.

FIG. 12 is a flowchart of the pairing process of specifying a connected-to apparatus by the electronic camera 1010 and the portable telephone 1040.

When the portable telephone 1040 enters a communications state, the process program performed by the information processing device of each communications apparatus branches to 'Start' in step S200 (hereinafter referred to as S200 for short) shown in FIG. 12. The power source of the electronic camera 1010 is applied in S102 'Applying power source', and control is passed to the next S104 'Selecting pairing in a setup mode' to establish communications with another specific communications apparatus.

In the next S106 'Inputting password for electronic camera manager', for example, the password identifying the owner of the electronic camera 1010 is input by operating the input device 1118. In the determination in the next S108 'Password?', the information processing device 1116 of the electronic camera 1010 compares the password input by the user with the password recorded in advance in the recording device such as the memory 1123, etc. The password specifying the owner of the electronic camera 1010 recorded in the memory 1123, etc. is recorded in the nonvolatile memory when the electronic camera 1010 is produced. The password can be assigned such that the owner of the electronic camera 1010 can be appropriately changed.

If the two passwords do not match each other as a result of the comparison in S108, the process by the information processing device 1116 is passed to S110 'Failing in authenticating process', and the subsequent image-capturing or reproducing process is restricted. Then, control is passed to S120 'End', thereby terminating the password comparing process.

If the two passwords match each other as a result of the comparison, the process by the information processing device 1116 is passed to S112 'Searching for portable telephone'. In S112, the wireless communications are started, and a process of searching for a communications apparatus (the portable telephone 1040, etc.) which can be provided with the image-capturing condition or the reproducing condition of the electronic camera 1010 of the portable telephone 1040, etc. in a wireless communications range.

The portable telephone 1040 is also set in the set-up mode, control is passed to S202 'Selecting pairing in set-up mode', a state in which communications can be established with another specific communications apparatus (corresponding to the electronic camera 1010) is entered, and the other party is searched for. When the wireless communications are synchronized between the communications apparatuses of the portable telephone 1040 and the electronic camera 1010, the process of connecting communications is completed. At this time, the display device 1132 of the electronic camera 1010 displays a list of the names, etc. of one or more communications apparatuses whose communications connecting processes have been completed, and the user can select a communications apparatus for subsequently performing the communications.

In the next S114 'Selecting portable telephone', for example, the portable telephone 1040 is selected as the other party in communications. When the other party in communications is determined, control is passed to the next S116 'Generating Pin code, and transmitting it to portable telephone' and the information processing device 1116 of the electronic camera 1010 issues the 'Pin' code (personal identification number) and displays it. The user reads the Pin code, and inputs the Pin code through the input device 1152 of the portable telephone 1040 in S204 'Inputting received Pin code by user'.

The portable telephone 1040 compares the input Pin code with the Pin code received from the electronic camera 1010. When they match each other, control is passed to S206 'Communicating with electronic camera, and generating and storing link key', the link key for mutual authentication is generated, and the key is recorded in the recording device such as the PROM 1161, etc. Then, control is passed to the next S120, thereby terminating the authenticating process.

The process program of the electronic camera 1010 is passed to S118 'Communicating with portable telephone, and generating and storing link key', the link key for mutual authentication is generated, and recorded in the recording device such as the memory 1123, etc. Then, control is passed to the next S120, thereby terminating the authenticating process.

Normally, in the wireless communications, communications are established among a plurality of communications apparatuses, the pairing process is performed between the communications apparatuses so that communications can be established through automatic authentication from the next communications. When the pairing process is performed, the 'link key' required in each communications apparatus, and the identification information such as an ID, etc. unique to the communications apparatus of the other party are stored for use in the subsequent connecting processes, thereby realizing an automatic authenticating process.

Furthermore, the pairing operation is performed between the electronic camera 1010 and the portable telephone 1040 in advance, and the function is restricted when the electronic camera 1010 is used according to whether or not communications can be performed through automatic authentication between the electronic camera 1010 and the portable telephone 1040 so that the 'link key' used for connection can also be used as an authentication code.

If the portable telephone 1040 paired with the electronic camera 1010 is not at hand of the operator, communications are not realized by automatic authentication, but are used in the 'unauthenticated mode'.

FIG. 13 is a flowchart used when a user authenticating process is performed by starting the communications between the electronic camera 1010 and the portable telephone 1040.

When the portable telephone 1040 enters the communications state, the process program performed by the information processing device of each communications apparatus is branched to step S140 'Start' shown in FIG. 13. When electric power is applied to the electronic camera 1010, the process program of the electronic camera 1010 is passed to S142 'Activating in 'unauthenticated mode' with electric power turned on', and control is passed to the next S144 'Searching for peripheral device' to establish communications with another specific communications apparatus.

In S144, wireless communications are started, and the process of searching for a communications apparatus such as the portable telephone 1040, etc. in a wireless communications range. When the portable telephone 1040 receives a search signal issued by the electronic camera 1010, it performs the synchronizing process between communications apparatuses in the wireless communications in S242 'Reply to electronic camera', and transmits a reply to the electronic camera 1010.

The process program of the electronic camera 1010 which has received the reply passes to S146 'Establishing transmission line', and continues the subsequent communications by recognizing the portable telephone 1040. On the other hand, the process program of the portable telephone 1040 also passes to S244 'Establishing transmission line' to recognize the electronic camera 1010. Then, in the next S246 'Transmitting authentication code', the 'authentication code' is transmitted to the electronic camera 1010.

The electronic camera 1010 which has received the 'authentication code' passes to S148 'Authenticating process', and compares the identification information unique to the electronic camera 1010 contained in the received 'authentication code' with the identification information recorded in the recording device of the electronic camera 1010. If the information match each other as a comparison result, then the reproducing or image-capturing mode of the electronic camera 1010 is set as the 'authenticated mode' in the next S150 'Switching to the authenticated mode'. If the information does not match each other as a comparison result, then the reproducing or image-capturing mode of the electronic camera 1010 is set as the 'unauthenticated mode', and the subsequent processes are performed. Then, control is passed to the next S152 'End', thereby terminating the authenticating process routine.

Figure 14:
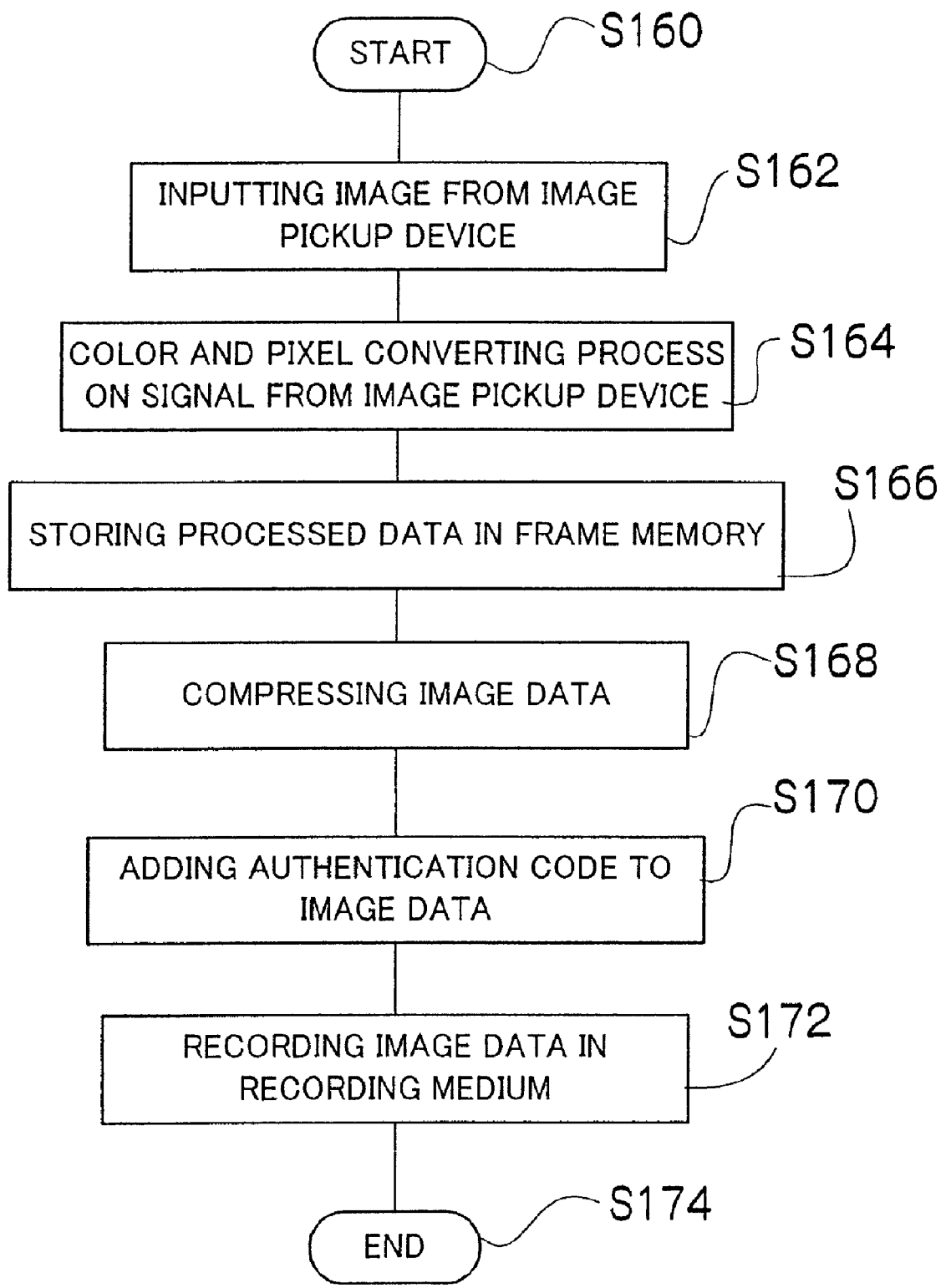
FIG. 14 is a flowchart of an image-capturing process by an electronic camera.

FIG. 14 is a flowchart of the image-capturing process performed by the electronic camera 1010

In FIG. 14, if a user operates the release button provided in the input device 1118 of the electronic camera 1010, the process program performed by the information processing device 1116 of the electronic camera 1010 branches to S160 'Start', and control is passed to the next S162 'Inputting image from image pickup device'.

In S162, the image pickup device 1110 obtains an image at a predetermined timing. In the next S164 'Color and pixel converting process on signal from image pickup device', an image signal output from the image pickup device 1110 is transmitted to the image processing device 1120 to perform an image process by amplifying a signal, reducing noise, converting the number of pixels, etc.

In the next S166 'Storing processed image data in frame memory', the image data obtained from the image processing device 1120 is temporarily stored in the frame memory 1121. Then, in S168 'Compressing image data', the information processing device 1160 reads the image data recorded in the frame memory 1121, transmits it to the compression releasing device 1124, and compresses the image by a compressing method or at a compression rate depending on the image-capturing condition.

In the next S170 'Adding authentication code to image data', the information indicating the reproducing condition such as the 'authentication code', etc. to the authentication code storage unit of an image file to be recorded, and the image file is recorded in the recording medium 1126 in the next S172 'Recording image data in storage medium'. When the image file is completely recorded, the process program of the electronic camera 1010 passes to S174 'End', thereby terminating the image-capturing process routine, and returning control to the original process routine.

Figure 15:
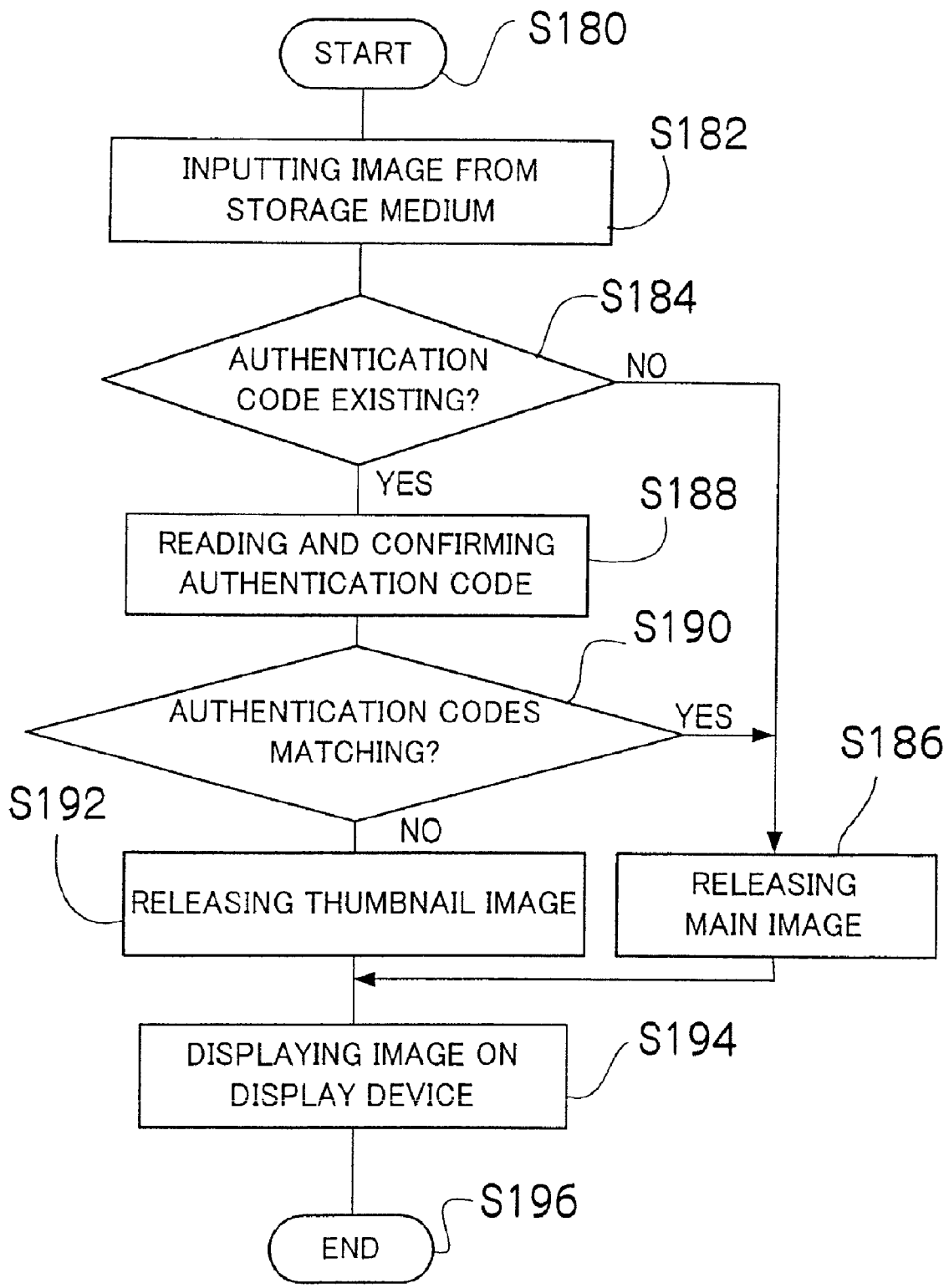
FIG. 15 is a flowchart of a reproducing process by an electronic camera.

FIG. 15 is a flowchart of the reproducing process performed by the electronic camera 1010.

In FIG. 15, when the process mode of the electronic camera 1010 is set as the reproducing mode, the process program of the information processing device 1116 of the electronic camera 1010 is branched to S180 'Start'. Then, in the next S182 'Inputting image from storage medium', an image file recorded in the user-desired recording medium 1126 is read.

The information processing device 1116 determines whether or not an 'authentication code' indicating the reproducing condition has been added to the authentication code recording unit of the read image file. If the 'authentication code' has not been assigned, then it is determined that the file contains an image for which a reproducing condition is not provided, the process program branches to S186 'Releasing main image', the main image recorded in the image file is released and developed as is into the image data for display, and the developed data is displayed on the display device 1132, etc. in the next S194 'Displaying image on display device'.

If the image file contains the 'authentication code', then control is passed to the next S188 'Reading and confirming authentication code', the 'authentication code' is read from the image file, and compared with the 'authentication code' received from another communications apparatus such as the portable telephone 1040, etc. after the determination in the next S190 'Authentication codes matching?'. If it is determined that the 'authentication codes' match each other as a comparison result, then the process program branches to S186, the main image is released as in the case in which the 'authentication code' has not been recorded, and the image is displayed as is on the display device 1132, etc. in the next S194.

If the 'authentication codes' do not match each other in S190, then it is determined that a reproducing process is restricted in the image file, the information processing device 1116 reads a reduced image (thumbnail image) recorded in the image file in the next S192 'Releasing thumbnail image', develops it into image data for display, and displays it on the display device 1132 in the next S194. An image to be displayed can be reduced in resolution to be displayed on the display device 1132 by reading the image data of the main image and processing it by thinning the pixels, etc.

When the image displaying process terminates in S194, the process program of the information processing device passes to S196 'End', thereby returning to the original process routine.

In the above mentioned embodiments, the portable telephone 1040 is used as an apparatus for authenticating a user when the electronic camera 1010 is used. However, the present invention is not restricted to the portable telephone 1040, but a communications apparatus provided with a communications device such as a PDA, a portable personal computer, etc. can attain the purpose of the present invention.

Furthermore, according to the above mentioned embodiments, the portable telephone 1040 is used for one electronic camera 1010. However, by providing a communications apparatus or an antenna which replaces the portable telephone 1040 in a certain area at a constant interval, the electronic camera 1010 can be set to be available only in a specific area such as an amusement park, a theme park, etc. Furthermore, the above mentioned communications apparatus and an antenna can be provided in an art gallery, a museum, etc. to set the image-capturing condition of restricting the image-capturing process in a place where image-capturing is restricted.

In the above mentioned embodiments of the present invention, an 'authentication code' is obtained when the electronic camera 1010 establishes wireless communications. However, the present invention is not restricted to this application, but an authenticating process can be performed by periodically receiving an 'authentication code'.

Furthermore, the server 1090 records the information shown in FIGS. 9 through 11 in advance in the above mentioned embodiments of the present invention to output to the electronic camera 1010 the 'authentication code' specifying an image-capturing or reproducing condition of the electronic camera 1010. However, the present invention is not restricted to this application, but the portable telephone 1040 records the information shown in FIGS. 10 and 11 in advance to output to the electronic camera 1010 the 'authentication code' specifying an image-capturing or reproducing condition of the electronic camera 1010. Otherwise, the electronic camera 1010 records the information shown in FIGS. 9 to 11 in advance to obtain the identification information specifying a user from each portable telephone and set the image-capturing or reproducing condition, thereby attaining the object of the present invention.

As described above, the recording apparatus according to the present invention includes a first communications device which can receive from another communications apparatus by wireless an image-capturing condition of restricting an image-capturing process or a sound recording condition of restricting a sound recording process, and a device of performing an image-capturing or sound recording process according to the received image-capturing condition or sound recording condition. With the configuration, the recording function of a recording apparatus can be automatically set in a restricted state without special care of the restriction in a place where image-capturing or sound recording is restricted.

According to another aspect of the present invention, a communications apparatus includes a recording device which records an image-capturing condition of restricting an image-capturing process by a recording apparatus carried by a user or a sound recording condition of restricting a sound recording process, and a communications device which can transmit the image-capturing condition or sound recording condition recorded in the recording device to the recording apparatus by wireless. With the configuration, the communications apparatus can automatically set the recording function of the recording device carried by the user in a restricted state in a position where image-capturing, sound recording, etc. are restricted.

When there is the possibility that image-capturing can badly affect anything, or where image-capturing is legally prohibited, a subject can be protected by automatically prohibiting image-capturing by a camera. Furthermore, by automatically restricting the image-capturing condition of a camera, image-capturing a copyrighted article can be effectively restricted, thereby protecting the copyright without fail. Additionally, by allowing image-capturing a copyrighted article using a camera on a specified condition, the conditional image-capturing process on a copyrighted article can be widely utilized.

Furthermore, the communications apparatus of the present invention includes a communications device which can receive a reproducing condition of restricting the function of reproducing an image from another communications apparatus by wireless, and a reproducing device which reproduces an image according to the received reproducing condition. With the configuration, the user of the communications apparatus can be easily specified, thereby restricting an available function.

Another embodiment of the present invention includes a recording device which records in advance first identification information for specifying a first user of a communications apparatus, a communications device which can receive identification information from another communications apparatus by wireless, associated with a reproducing condition of restricting the function of reproducing an image, for specifying a second user of a communications apparatus, a matching device which compares the first identification information specifying the first user with the second identification information specifying the second user, and a reproducing device which reproduces an image according to a comparison result. With the configuration, an available function can be restricted by easily specifying a user of the communications apparatus.

A further embodiment of the present invention includes a recording device which records an image and a first reproducing condition of restricting the function of reproducing the image, a reception device which receives a second reproducing condition of restricting the function of reproducing an image from another communications apparatus; a matching device which compares the first reproducing condition with the second reproducing condition, and a reproducing device which reproduces an image according to a comparison result. With the configuration, an available function can be restricted by easily specifying a user of the communications apparatus.

Since the electronic camera is provided with the function of automatically recognizing a user, the load of authenticating a user can be reduced without forcing the user to specifically perform an authenticating operation, a user of an electronic camera can be specified, and an image-capturing or reproducing process can be restricted. Furthermore, an authenticating data can be associated with an image to embed recorded or authentication data inside the image, thereby restricting a user who can view the image data.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A communications system, comprising:
   a first communications apparatus, comprising:
      a first communications device which receives a reproducing condition of restricting a function of reproducing an image from another communications apparatus by wireless; and
      a reproducing device which reproduces an image according to the received reproducing condition;
   a second communications apparatus, comprising
      a first recording device which records first identification information specifying a user of the first communications apparatus; and
      a second communications device which transmits the first identification information recorded in the first recording device to another communications apparatus; and
   a third communications apparatus, comprising:
      a second recording device which records a reproducing condition of restricting a reproducing function of an image of the first communications apparatus as associated with second identification information specifying a user of the first communications apparatus;
      a reception device which receives the first identification information specifying the user of the first communications apparatus; and
      a transmission device which reads and transmits a reproducing condition of an image of the first communications apparatus recorded as associated with the second identification information in the second recording device according to the first identification information.

2. The communications system according to claim 1, wherein:
   the first communications device of the first communications apparatus receives an image-capturing condition of restricting an image-capturing function from another communications apparatus by wireless;
   the first communications apparatus comprises an image-capturing device which performs an image-capturing process according to the received image-capturing condition;
   the second recording device of the third communications apparatus records the image-capturing condition of restricting an image-capturing function of the first communications apparatus as associated with second identification information specifying a user of the first communications apparatus; and
   the transmission device of the third communications apparatus reads and transmits the image-capturing condition of the image of the first communications apparatus recorded as associated with the second identification information in the second recording device according to the received first identification information.

3. A communications system, comprising:
a first communications apparatus, comprising:
a first recording device which records an image associated with a first reproducing condition of restricting a reproducing function of the image;
a first communications device which receives a second reproducing condition of restricting a reproducing function of an image from another communications apparatus;
a matching device which compares the first reproducing condition with the second reproducing condition; and
a reproducing device which reproduces an image according to a comparison result;
a second communications apparatus, comprising:
a second recording device which records first identification information specifying a user of the first communications apparatus; and
a second communications device which transmits the first identification information recorded in the second recording device to another communications apparatus; and
a third communications apparatus, comprising:
a third recording device which records the second reproducing condition of the image of the first communications apparatus associated with second identification information specifying the user of the first communications apparatus;
a reception device which receives the first identification information specifying the user of the first communications apparatus; and
a transmission device which reads and transmits the second reproducing condition recorded as associated with the second identification information in the third recording device according to the received first identification information.

4. The communications system according to claim 3, wherein:
the first communications apparatus further comprises an image pickup device which captures an image of a subject;
the first recording device of the first communications apparatus records an image obtained by an image-capturing process as associated with the received reproducing condition; and
the reproducing device of the first communications apparatus reproduces an image according to one of the comparison result and the second reproducing condition.

5. A communications system, comprising:
a first communications apparatus, comprising:
a first recording device which records an image associated with a first reproducing condition of restricting a reproducing function of the image;
a first communications device which receives a second reproducing condition of restricting a reproducing function of an image from another communications apparatus;
a matching device which compares the first reproducing condition with the second reproducing condition; and
a reproducing device which reproduces an image according to a comparison result,
a second communications apparatus, comprising:
a second recording device which records first identification information specifying a user of the first communications apparatus; and
a second communications device which transmits the first identification information recorded in the second recording device to another communications apparatus,
a third communications apparatus, comprising:
a third recording device which records the second reproducing condition of the image of the first communications apparatus associated with second identification information specifying the user of the first communications apparatus;
a reception device which receives the first identification information specifying the user of the first communications apparatus; and
a transmission device which reads and transmits the second reproducing condition recorded as associated with the second identification information in the third recording device according to the received first identification information.

* * * * *